United States Patent [19]

Kerrigan et al.

[11] Patent Number: 5,404,488

[45] Date of Patent: Apr. 4, 1995

[54] REALTIME DATA FEED ENGINE FOR UPDATING AN APPLICATION WITH THE MOST CURRENTLY RECEIVED DATA FROM MULTIPLE DATA FEEDS

[75] Inventors: Michael Kerrigan, Tewksbury; Michael A. Dempsey, Watertown, both of Mass.

[73] Assignee: Lotus Development Corporation, Cambridge, Mass.

[21] Appl. No.: 131,018

[22] Filed: Oct. 1, 1993

Related U.S. Application Data

[63] Continuation of Ser. No. 588,612, Sep. 26, 1990, abandoned.

[51] Int. Cl.6 ............................................. G06F 13/00
[52] U.S. Cl. ................. 395/425; 364/243.41; 364/DIG. 1
[58] Field of Search ............... 395/425, 600, 800, 400

[56] References Cited

U.S. PATENT DOCUMENTS

| | | | |
|---|---|---|---|
| 3,344,406 | 9/1967 | Vinal | 395/425 |
| 4,298,959 | 11/1981 | Sundermeyer | 395/425 |
| 4,488,220 | 12/1984 | Friedli | 395/425 |
| 4,631,673 | 12/1986 | Haas et al. | 395/600 |
| 4,642,760 | 2/1987 | Yanai | 395/725 |
| 4,714,995 | 12/1987 | Materna | 395/600 |
| 4,750,135 | 6/1988 | Boilen | 364/514 |
| 4,815,030 | 3/1989 | Cross et al. | 395/600 |
| 4,855,906 | 8/1989 | Burke | 395/600 |
| 4,897,782 | 1/1990 | Bennett | 395/600 |
| 5,043,886 | 8/1991 | Witek | 395/425 |
| 5,113,514 | 5/1992 | Albonesi | 395/425 |
| 5,119,485 | 6/1992 | Ledbetter | 395/425 |

Primary Examiner—Thomas G. Black
Assistant Examiner—Jennifer M. Orzech
Attorney, Agent, or Firm—Fish & Richardson

[57] ABSTRACT

A realtime engine for interfacing one or more data feeds with an applications. Each of the data feeds delivers realtime data for each member of an associated group of items available through the data feed. The interface includes logic for caching the most recent data values received from a selected one of the data feeds for at least some members of the associated group of items for the selected data feed. The interface also includes logic for sending at least some of the cached data values to the application in response to a request for updates.

14 Claims, 53 Drawing Sheets

Application Information Structure 1202

| | |
|---|---|
| Process ID | 1210 |
| Index Number | 1212 |
| Application Type | 1214 |
| Application Flags | 1216 |
| One-time Request Info | 1218 |
| Data Feed Error Info | 1220 |
| Data Feed Table Position | 1222 |
| Field Table Position | 1224 |
| Application Statistics | 1226 |
| Application Interest/Filter List Info | 1228 |
| Queue Info | 1230 |
| Feed Server Data | 1232 |
| Pointer to Call-back Function | 1234 |
| Request Access Semaphore | 1236 |
| List Access Semaphore | 1238 |
| Poll Access Semaphore | 1240 |
| 1242 — Memory Heap Pointer | → |
| 1244 — Pointer to Poll Update Buffer | → |

| Message Buffer - Pipe 0 | 3700 |
| Message Buffer - Pipe 1 | 3700 |
| Message Buffer - Pipe 2 | 3700 |
| Message Buffer - Pipe 3 | 3700 |
| Message Buffer - Pipe 4 | 3700 |
| Message Buffer - Pipe 5 | 3700 |
| Message Buffer - Pipe 6 | 3700 |
| Message Buffer - Pipe 7 | 3700 |

FIG. 16

```
Create Realtime Engine Process System Semaphore.
If database not initialized
4100 — Initialize first page of private shared memory pool
       Call routine that reads, parses the configuration file and builds the data dictionary.
       Allocate memory for hash table index for each datafeed defined in configuration file.
       Sort Datafeeds by datafeed name.
4102 — Perform other necessary house keeping.
   Else database already present in memory
       Make memory addressable to RTE Process.
       Perform other necessary house keeping
   endif
4104 — Allocate Named shared memory area where private RTE statistics are stored.
4106 — Allocate memory for the ring of buffers used to buffer incoming messages
       Lock first buffer in ring of buffers.
       Allocate memory for message buffers used in each feed server thread.
      ┌ Create Updater Thread.
      │ Boost priority of updater thread.
4108 —┤ Create Private Pipe Used exclusively by RTE and applications connected to RTE.
      │ Create multiple instances of a Pipe used by Feed servers to communicate messages to RTE.
      └ Allocate stack memory, create thread to read each pipe instance created in the previous
        steps.
   Boost priority of all threads that read incoming pipes.
   Set up exit list routine
   Set up signal handler routine
```

FIG. 21

```
Check for Termination of Realtime Engine Process

Boost priority of the main thread.
While RTE process system semaphore is set
    Wait for a timeout of 100 millisecs
    Keep track of total number of seconds RTE process is running
    Lock Buffer Ring semaphore
    If messages in current buffer
        If buffer timeout expiried
            Lock next buffer in buffer ring
            Release current buffer to Updater thread
        Endif
    Endif
    Release Buffer Access semaphore
Endwhile
If RTE process system semaphore is cleared, terminate the RTE process.
```

FIG. 22

```
Termination of the Realtime Engine Process

Free memory used for the RTE Database.
Check for application connections, if no applications are connected reset database
    initialization flags.
Free named shared memory allocated during initialization for private RTE statistics.
Free all memory used by RTE process to buffer messages
Disconnect and close all pipe connections.
```

FIG. 23

```
Thread 2 - Read RTE Private Pipe

Wait for a connection on the named pipe.
When connection established, enter read message loop.

Read Message Loop
  If message available
4110 {  If bytes read equal 0
          Terminate read message loop.
          Disconnect name pipe, goto Wait for a connection on the named pipe.
4112 {  Else if bytes read not equal to message length in message
          Toss message
          Continue read message loop.
        Else
          Lock buffer ring semaphore
          If messages fits in current buffer
            Place message in buffer
4114 {    Else Message does not fit in current buffer
            Lock next buffer in buffer ring
            Release current buffer to Updater Thread
            Make next buffer in buffer ring the current buffer
            Place message in buffer
            Set new timeout values
          Endif
4116 {  If buffer timeout expiried
          Lock next buffer in buffer ring
          Release current buffer to Updater Thread
        Endif
        Release buffer ring semaphore
    Endif
  Else
    Wait for message.
  Endif
```

FIG. 24

```
Threads 3 - 9 Feed Server Pipe

Wait for a connection on the named pipe.
When connection established, enter read message loop.

Read Message Loop
If message available
    If bytes read equal 0
        Terminate read message loop.
        Disconnect name pipe, goto Wait for a connection on the named pipe.
    Else if bytes read not equal to message length in message
        Toss message
        Continue read message loop.
    Else
        Lock buffer ring semaphore
        If messages fits in current buffer
            Place message in buffer
        Else Message does not fit in current buffer
            Lock next buffer in buffer ring
            Release current buffer to Updater Thread
            Make next buffer in buffer ring the current buffer
            Place message in buffer
            Set new timeout values
        Endif
        If buffer timeout expiried
            Lock next buffer in buffer ring
            Release current buffer to Updater Thread
        Endif
        Release buffer ring semaphore
    Endif
Else
    Wait for message.
Endif
```

FIG. 25

```
Thread 10 - Updater Thread
4120-Buffer Processing Loop
     Wait for next available buffer in buffer ring
     Process buffer
4122~Message Process Loop (For each message in the buffer)
       Locate datafeed interest list
       If datafeed interest list found
4124─┤  If message length invalid
          Continue to next message
       Else
          If message is a Refresh message
            If Application Request Pending
              Reformat message
4126─┤      Set application request access semaphore
            Place message on application pending queue
            Clear application request pending and request access semaphores
          Endif
       Endif
4128~If message is a Refresh or a Update Message
       If length of message key valid
         Locate Record in hash table
         If record found
           Lock Record Access Semaphore
4130~      Field Process Loop (For each field in message)
             Locate field in record
             If field found
               Update record field data with message field data
4132~          If field watched by a filter list application
                 Format Update for filter list application
                 Place Update in filter list queue for every application
                   affected.
4134~          Release appropiate queue semaphores
             Endif
             Increment to next field in message
             Else (field not found)
               Locate field in Datafeed Data dictionary
               If field found
                 Increment to next field in message
```

FIG. 26a

```
              Continue Field Process Loop
          Else if field not found
              Terminate Field Process Loop
              Continue Message Process Loop
          Endif
      Else
          Continue to next message
      Endif
  Else
      Continue to next message
  Endif
  If message is a Internal Delete Message
      For each Record in the Internal Delete Message
          Locate Record in hash table
          If record found
              Lock Data Feed Access semaphore
              Erase process ID associated with message from array of process ID's
              If record not in use by any applications
                  Free memory used for record fields
                  Remove record from hash table index
                  Free memory used for record
              Endif
              Release Data Feed Access semaphore
          Endif
      End For
  Endif
Else
4138 — Continue to next message
Endif
Continue Buffer Processing Loop
```

FIG. 26b

```
Registration Function: rte_reg

If Realtime Engine is running
    Get process ID of application that is being registered
    Check for valid function arguments
    If valid function arguments
        Save Application Call-back function
        Make RTE private shared memory addressable by process
        Locate Process ID in application table
        If process ID not in application table
            If space available in application table
                Add process ID to process table
                Allocate interest/filter list memory
                Initialize all components of application table entry
                Install termination function on process exit list
            Endif
        Endif
    Endif
Else
    Return an error to application
Endif
```

FIG. 27

```
Termination Function: rte_term

Get Process ID
Locate Process ID in application table
If process ID in application table
    Clear any set semaphores
    Check Application Type
    If application type is "polling" or "both" (polling & queueing)
        Open interest list
        Delete interest list
        If application is "both"
            Set don't write request bit
        Close interest list
    Endif
    Clear don't write request bit
    If application type is "queueing" or "both" (polling & queueing)
        Open filter list
        Delete filter list
        Close filter list
    Endif
    Remove process id from application table (Set ID to 0)
    Free Memory Heap Pointer
    If necessary remove termination function from process exit list
Endif
```

FIG. 28

```
Get Datafeed Information For First Alphabetical Datafeed Name: rte_getfstdf

If Realtime Engine process running
    If process ID in application table
        If any datafeeds defined
            Fill application structure with datafeed information for first alphabetical
                datafeed.
            Remember application position in datafeed table
            Return to application
        Endif
    Endif
Endif
```

FIG. 29

```
Get Datafeed Information For Next Alphabetical Datafeed Name: rte_getnxtdf

If Realtime Engine Process running
    If process ID in application table
        If any datafeeds defined
            If not at end of data feed list
                Fill application structure with datafeed information for next alphabetical
                    datafeed.
                Remember application position in datafeed table
                Return to application
            Endif
        Endif
    Endif
Endif
```

FIG. 30

```
Get Datafeed Information: rte_getdf

If Realtime Engine Process running
    If process ID in application table
        If any datafeeds defined
            If datafeed name specified
                Locate datafeed information using datafeed name
            Else
                Locate datafeed information using datafeed identification code
            Endif
            If datafeed information found
                Fill application structure with datafeed information
                Return to application
            Endif
        Endif
    Endif
Endif
```

FIG. 31

```
Get Field Information For First Alphabetical Field Name: rte_getfstfld

If Realtime Engine process running
    If process ID in application table
        Locate datafeed specfied
        If datafeed found
            If there are fields
                Fill application structure with field information for first alphabetical field.
                Remember application position in field table
                Return to application
            Endif
        Endif
    Endif
Endif
```

FIG. 32

```
Get Field Information For Next Alphabetical Field Name: rte_getnxtfld

If Realtime Engine process running
    If process ID in application table
        If not at end of field list
            Fill application structure with field information for next alphabetical field.
            Remember application position in field table
            Return to application
        Endif
    Endif
Endif
```

FIG. 33

```
Get Field Information: rte_getfld

If Realtime Engine Process running
    If process ID in application table
        Locate Datafeed information
        If datafeed name specified
            Locate datafeed information using datafeed name
        Else
            Locate datafeed information using datafeed identification code
        Endif
        If datafeed information found
            Locate field information
            If field name specified
                Locate field information using field name
            Else
                Locate field information using field identification code
            Endif
            If field information found
                Fill application structure with datafeed information
            Endif
        Endif
    Endif
Endif
```

FIG. 34

Open Interest List: rte_openilist

If process ID in application table
  If application is a polling application
4202~    If interest list not opened
      If interest/filter list open semaphore is clear
        Set interest/filter list open semaphore
        Set poll lock semaphore
        Share RTE memory with application
        Set application interest list open flag bit
      Endif
    Endif
  Endif
Endif

FIG. 35

```
Add Item to Interest List: rte_addilist

If process ID in application table
    If application is a polling application and interest list is opened
    Locate datafeed information to which the item is added
    Locate field information
    If datafeed and field information found
        Boost priority of application
        Set list lock semaphore
4210 ⎰ Locate application datafeed interest list
     ⎱ If application datafeed interest list not found
           Create application datafeed interest list
        Endif
        Lock RTE datafeed master interest list semaphore
        Locate add key in master interest list
4212 ⎰ If key found in master interest list
     ⎱     Unset any delete message bits in record
           If delete sent flag set
               Set send add message flag in record flags
               Increment add message count for datafeed
           Endif
        Endif
4214 ⎰ If key not found in master interest list
     ⎱     Allocate memory for new master interest list record
           Initialize record components
           Compute hash value for record
           Add record to hash index for datafeed
        If new record
           Set Send Add message bit in record flags
           Increment add message count for datafeed
        Endif
4216 ⎰ If application process id not in process id table of record
     ⎱     Add application process id to process id table in record
        Endif
        Set master interest list record lock semaphore
```

FIG. 36a

```
Locate field in master interest list record
If field not found in master interest list record
    Find an unused field in master interest list record field blocks
    If unused field not found in a record field blocks
        Allocate memory for a new field block
        Add new field block to master interest list record
    Endif
    Initialize field components
    If add message bit not set
        Set send refresh message bit in record flags
    Endif
Endif
Clear master interest list record lock semaphore
Clear RTE datafeed master interest list semaphore
Locate key in application interest list
If key not found in application interest list
    Allocate memory for application interest list record
    Compute hash value for interest list record
    If duplicate hash value
        Locate key
        If duplicate key value
            Add record to duplicate key value link list
        Else
            Add record to hash value link list
        Endif
    Else
        Add record to hash value link list
    Endif
Endif
Point application interest list record to master interest list record
Remember application private key data
Locate field in application interest list record
If field not found in application interest list record
    Allocate memory for new application interest list record field
    Remember application private field data
    If field is a string field
        Allocate memory for string data
    Endif
    Insert new field at beginning of field link list
```

FIG. 36b

```
    Endif
4224 ~ Set change interest list flag to True
4226 ~ Set application interest list record change bit flag
     Clear application interest record delete bit flag
     Clear list lock semaphore
     Lower priority of application
  Endif
Endif
```

FIG. 36c

Delete Key from Interest List: rte_delikey

If process ID in application table
   If application is a polling application and interest list is opened
      Locate datafeed information from which the key is to be deleted
      If datafeed information found
         Boost priority of application
         Set list lock semaphore
         Locate application interest list record
         If application interest list record found
            Set delete record bit in application interest list record
            Delete all application interest list record fields
            If delete all duplicates
               For each duplicate
                  Set delete record bit in application interest list record
                  Delete all application interest list record fields
               Endfor
            Endif
         Clear list lock semaphore
         Restore priority of application
      Endif
   Endif
Endif

FIG. 37

```
Delete Field from Interest List: rte_delifield

If process ID in application table
    If application is a polling application and interest list is opened
        Locate datafeed information from which the field is to be deleted
        If datafeed information found
            Locate field information of field to be deleted
            If field information found
                Locate datafeed within application interest list
                If datafeed found
                    Set list lock semaphore
                    Boost priority of application
                    Locate key in application interest list
                    If key found
                        If field exists
                            Delete field from application interest list record
                        Endif
                        If delete field from all duplicate application interest list records
                            For each application interest list record
                                If field exists
                                    Delete field from application interest list record
                                Endif
                            Endfor
                        Endif
                        Clear list lock semaphore
                        Restore priority of application
                    Endif
                Endif
            Endif
        Endif
    Endif
Endif
```

FIG. 38

```
Delete Interest List: rte_delilist

If process ID in application table
    If application is a polling application and interest list is opened
        Set list lock semaphore
        Boost priority of application
        For each datafeed within application interest list
            For each hash bucket within datafeed interest list
                For each duplicate hash value interest list record
                    For each duplicate key value interest list record
                        Set delete record bit in application interest list record
                        Delete all application interest list record fields
                    Endfor
                Endfor
            Endfor
        Endfor
        Clear interest list lock semaphore
        Lower priority of application
    Endif
Endif
```

FIG. 39

```
Close Interest List: rte_closeilist

If process ID in application table
    If application is a polling application and interest list is opened
        Boost priority of application
        Set list lock semaphore
        For each individual datafeed interest list within entire application interest list
            For each hash bucket in datafeed interest list index
                For each duplicate hash value interest list record
                    If delete all interest list records instances
                        If master record not used by other applications
                            If marked for add
                                Mark for internal delete only
                            Else mark master record for deletion
                            Endif
                        Endif
                        For each duplicate interest record instance
                            Delete all interest list record fields
                            Delete interest list record instances
                        Endfor
                        Reset duplicate hash value interest list record link list
                    Else if delete some interest list record instances
                        For each duplicate interest record instance
                            If record marked for deletion
                                Reset duplicate interest record instance link list
                                Delete all interest list record fields
                                Delete interest list record
                            Endif
                        Endfor
                    Endif
                Endfor
            Endfor
        Endfor
```

FIG. 40a

```
If no pipe write flag feed servers set to FALSE
Set pipes open flag
Allocate memory for remember records
Initialize datafeed error information.
For each datafeed control block
    If adds, deletes, refresh counts greater than 0 and datafeed is smart
        If delete or internal delete counts are greater than 0
            Set an internal write delete request to RTE flag
        Endif
        If feed server pipe not already opened
            Lock datafeed pipe semaphore
            Open feed server pipe and remember feed server pipe handle in pipe handle table
        Else
            Remember feed server pipe handle in pipe handle table.
        Endif
    Endfor
Endif
If write delete request to RTE
    Open RTE private pipe
Endif
For each datafeed control block
    If adds, deletes, refresh counts greater than 0
        Get feed server pipe handle from pipe handle table
        Set feed server open flag accordingly
        Initialize message buffer pointers, counters, etc.
        For each master interest list index hash bucket
            If smart feed server and master record marked for add message
                If current add message buffer full
                    Send add message to feed server
                If message sent
                    For each key in add message
                        Clear add, refresh, delete message bit flags in master interest list
                            record
                    Endfor
                Endif
                Copy key from master interest list to add message buffer
```

FIG. 40b

```
Elseif smart feed server and master record marked for refresh message
    If current refresh message buffer full
        Send refresh message to feed server
        If message sent
            For each key in refresh message
                Clear refresh, delete message bit flags in master interest list
                    record
            Endfor
        Endif
    Endif
    Copy key from master interest list to refresh message buffer                    } 4308
Elseif smart feed server and master record marked for delete message
    If current delete message buffer full
        Send delete message to feed server
        Send delete message to RTE
        If message sent to feed server
            For each key in delete message
                Clear delete message bit flags in master interest list record
                Set delete message sent bit flag in master interest list record
            Endfor
        Endif
    Endif
    Copy key from master interest list to delete message buffer                      } 4310
Elseif master record marked for RTE delete message
    If current RTE delete message buffer full
        Send RTE delete message to RTE
        If message sent
            For each key in RTE delete message
                Set delete message sent bit flags in master interest list record
            Endfor
        Endif
    Endif
    Copy key from master interest list to RTE delete message buffer                  } 4312
Endif
Endfor
Endif
```

FIG. 40c

```
       ⎧  If smart feed server and add message buffer not empty
       ⎪    Send remaining add message to feed server
       ⎪    For each key in add message
4314 ──⎨      Clear add message bit flag in master interest list record
       ⎪    Endfor
       ⎩  Endif
       ⎧  If smart feed server and refresh message buffer not empty
       ⎪    Send remaining refresh message to feed server
       ⎪    For each key in refresh message
4316 ──⎨      Clear refresh message bit flag in master interest list record
       ⎪    Endfor
       ⎩  Endif
       ⎧  If smart feed server and delete message buffer not empty
       ⎪    Send remaining delete message to feed server
       ⎪    Send remaining delete message to RTE
       ⎪    For each key in delete message
4318 ──⎨      Set delete message sent bit flag in master interest list record
       ⎪    Endfor
       ⎩  Endif
       ⎧  If RTE delete message buffer not empty
       ⎪    Send Remaining RTE delete message to RTE
       ⎪    For each key in RTE delete message
4320 ──⎨      Set delete message sent bit flag in master interest list record
       ⎪    Endfor
       ⎩  Endif
          Endfor
          Close all open feed server pipe handles
          Close RTE pipe handle if opened
          Clear list lock semaphore
          Clear interest list open semaphore
          Clear poll lock semaphore
          Lower priority of application
       Endif
```

FIG. 40d

Open Filter List: rte_openflist

If process ID in application table
   If application is a queuing application
      If filter list not opened
         If interest/filter list open semaphore is clear
            Set interest/filter list open semaphore
            Share RTE memory with application
            Set application filter list open flag bit
         Endif
      Endif
   Endif
Endif

FIG. 41

```
Add Item to Filter List: rte_addflist

If process ID in application table
    If application is a queuing application and filter list is opened
    Locate datafeed information to which the item is added
    Locate field information
    If datafeed and field information found
        Boost priority of application
        Set list lock semaphore
        Locate application datafeed filter list
        If application datafeed filter list not found
            Create application datafeed filter list
        Endif
        Lock RTE datafeed master interest list semaphore
        Locate add key in master interest list
        If key not found in master interest list
            Allocate memory for new master interest list record
            Initialize record components
            Compute hash value for record
            Add record to hash index for datafeed master interest list
        Endif
        If new record
            Set Send Add message bit in master interest list record flags
            Increment add message count for datafeed
            Unset any delete message bits in record
        Endif
        If application process id not in process id table of record
            Add application process id to process id table in record
        Endif
        Set master interest list record lock semaphore
        Locate field in master interest list record
        If field not found in master interest list record
            Find an unused field in master interest list record field blocks
            If unused field not found in a record field block
                Allocate memory for a new field block
                Add new field block to master interest list record
            Endif
```

FIG. 42a

```
        Initialize field components
        Set Send Refresh message bit in record flags
    Endif
    Clear master interest list record lock semaphore
    Clear RTE datafeed master interest list semaphore
    Locate key in application filter list
    If key not found in application filter list
        Allocate memory for application filter list record
        Compute hash value for filter list record
        Add filter list record to hash value link list
    Endif
    Point application filter list record to master interest list record
    Locate field in application field list record
    If field not found in application filter list record
        Allocate memory for new application filter list record field
        Insert filter list field at beginning of field list
        Remember application private key data
        Remember application private field data
        Point filter list record field to master interest list record field
        Set bit in master interest list record field that is an index to application process
        table.
    Endif
    Clear list lock semaphore
    Restore priority of application
Endif
Endif
```

FIG. 42b

Delete Key from Filter List: rte_delfkey

If process ID in application table
  If application is a queuing application and filter list is opened
    Locate datafeed information from which the key is to be deleted
    If datafeed information found
      Boost priority of application
      Set list lock semaphore
      Locate application filter list record
      If application filter list record found
        Set delete record bit in application filter list record
        Clear master interest list record fields bits flags used by this application
        Delete all application filter list record fields
      Endif
      Clear list lock semaphore
      Restore priority of application
    Endif
Endif

FIG. 43

```
Delete Field from Filter List: rte_delffield

If process ID in application table
    If application is a queuing application and filter list is opened
    Locate datafeed information from which the field is to be deleted
    If datafeed information found
        Locate field information of field to be deleted
        If field information found
            Locate datafeed within application filter list
            If datafeed found
                Set list lock semaphore
                Boost priority of application
                Locate key in application filter list
                If key found
                    If field exists
                        Clear master interest list record field bit flag used by this application
                        Delete field from application filter list record
                    Endif
                Endif
                Clear list lock semaphore
                Lower priority of application
            Endif
        Endif
    Endif
Endif
```

FIG. 44

```
Delete Filter List: rte_delflist

If process ID in application table
    If application is a queuing application and filter list is opened
        Set list lock semaphore
        Boost priority of application
        For each datafeed within application filter list
            For each hash bucket within datafeed filter list
                For each duplicate hash value filtert list record
                    Set delete record bit in application filter list record
                    Clear master interest list record fields bit flags used by this application
                    Delete all application filter list record fields
                Endfor
            Endfor
        Endfor
        Clear list lock semaphore
        Restore priority of application
    Endif
Endif
```

FIG. 45

```
Close Filter List: rte_closeflist

If process ID in application table
    If application is a queuing application and filter list is opened
        Boost priority of application
        Set list lock semaphore
        For each individual datafeed filter list within entire filter list
            For each hash bucket in datafeed filter list index
                For each duplicate hash value filter list record
                    If filter list record marked for deletion
                        If master interest list record not used by other applications
                            Mark master record for deletion
                        Endif
                        Delete all filter list record fields
                        Delete filter list record
                        Reset duplicate hash value filter list record link list
                    Endif
                Endfor
            Endfor
        Endfor
        If write requests to feed servers
            Set pipes open flag
            Allocate memory for remember records
            Initialize datafeed error information.
            For each datafeed master interest list
                If adds, deletes, refresh counts greater than 0 and datafeed is smart
                    If feed server pipe not already opened
                        Lock datafeed pipe semaphore
                        Open feed server pipe and remember feed server pipe handle in pipe handle table
                    Else
                        Remember feed server pipe handle in pipe handle table.
                    Endif
                Endfor
            Endif
            If write delete request to RTE
                Open RTE private pipe
            Endif
            For each datafeed master interest list
                If adds, deletes, refresh counts greater than 0
```

FIG. 46a

```
Get feed server pipe handle from pipe handle table
Set feed server open flag accordingly
Initialize message buffer pointers, counters, etc.
For each master interest list index hash bucket
    If smart feed server and master record marked for add message
        If current add message buffer full
            Send add message to feed server
        If message sent
            For each key in add message
                Clear add, refresh, delete message bit flags in master interest list
                    record
            Endfor
        Endif
    Elseif smart feed server and master record marked for refresh message
        If current refresh message buffer full
            Send refresh message to feed server
        If message sent
            For each key in refresh message
                Clear refresh, delete message bit flags in master interest list
                    record
            Endfor
        Endif
    Elseif smart feed server and master record marked for delete message
        If current delete message buffer full
            Send delete message to feed server
            Send delete message to RTE
        If message sent to feed server
            For each key in delete message
                Clear delete message bit flags in master interest list record
                Set delete message sent bit flag in master interest list record
            Endfor
        Endif
    Elseif master record marked for RTE delete message
        Copy key from master interest list to delete message buffer
```

FIG. 46b

```
        If current RTE delete message buffer full
            Send RTE delete message to RTE
            If message sent
                For each key in RTE delete message
                    Set delete message bit flags in master interest list record
                Endfor
            Endif
            Copy key from master interest list to RTE delete message buffer
        Endif
    Endfor
Endif
If smart feed server and add message buffer not empty
    Send remaining add message to feed server
    For each key in add message
        Clear add message bit flag in master interest list record
    Endfor
Endif
If smart feed server and refresh message buffer not empty
    Send remaining refresh message to feed server
    For each key in refresh message
        Clear refresh message bit flag in master interest list record
    Endfor
Endif
If smart feed server and delete message buffer not empty
    Send remaining delete message to feed server
    Send remaining delete message to RTE
    For each key in delete message
        Set delete message sent bit flag in master interest list record
    Endfor
Endif
If RTE delete message buffer not empty
    Send Remaining RTE delete message to RTE
    For each key in RTE delete message
        Set delete message sent bit flag in master interest list record
    Endfor
Endif
Close all open feed server pipe handles
```

FIG. 46c

```
Close RTE pipe handle if opened
Clear list lock semaphore
Clear interest/filter list open semaphore
Lower priority of application
Endif
```

FIG. 46d

```
Poll Interest List: rte_update

If process ID in application table
  If application is a polling application
    Boost priority of application
    Set Poll Access semaphore
    For each datafeed interest list within application interest list
4402— If interest list was changed or master interest list was updated since last poll
        Set application datafeed update count equal to
          master datafeed update count
        For each interest list index hash bucket
          For each duplicate hash value interest list record
            Set duplicate key value interest list record
            Set field updated flags in application field data sturctures to false
            Set master interest list record Access semaphore
4404— If master interest list record changed or application interest list
              record changed since last poll
              Set application interest list record update count equal to master
                interest list record update count
              For each application interest list field
4406— If application interest list field is new or interest list field
                  changed since last poll
                  If new field
                    Clear new interest list field flag
                    Set internal new field flag to true
                  Endif
                  Set field update count in application interest list field
                    equal to field update count in master interest list field
4408— If application interest list field value different from last
                    poll
                    Copy master interest list record field data value into
                      application interest list field data value
                    Set Change bit flag in application interest list field data
                    Set flag to indicate new updates to application.
                  Endif
              Endfor
            Endif
4410— Clear master interest list record Access semaphore
      If new updates to application interest list fields
```

FIG. 47a

```
        For each application interest list field
            If interest list field updated
                Format update buffer
                Call application call back routine with update buffer.
            Endif
        Endfor
     Endif
    Endfor
   Endfor
  Endfor
 Endfor
Endfor
Restore priority of application
Clear Poll Access sempahore
Endif
Endif
```

FIG. 47b

```
Read Filter List Queue: rte_read

If process ID in application table
    If application is a queuing application
        Boost priority of application
        Set queue Access Control semaphore
        Check if messages waiting in queue
        If no messages in queue
            Set queue Reader Wait semaphore
        Endif
        Clear queue Access control semaphore
        If no messages in queue
            Wait until message arrives, or timeout specified expires
        Else if message available
            Set queue Access Control semaphore
            Obtain pointer to first message to queue
            Adjust queue information
            Clear queue Access Control semaphore
            Format queue message into application buffer
            Free memory used for queue message
        Endif
        Restore priority of application
        Return to application
    Endif
Endif
```

FIG. 48

REALTIME DATA FEED ENGINE FOR UPDATING AN APPLICATION WITH THE MOST CURRENTLY RECEIVED DATA FROM MULTIPLE DATA FEEDS

This is a continuation of application Ser. No. 07/588,612, filed Sep. 26, 1990, now abandoned.

BACKGROUND OF THE INVENTION

The invention relates to an interface for coupling data from a realtime data feed into an application program.

A realtime data feed is any data source that provides the data on a realtime basis, that is, essentially as the data becomes available or soon thereafter. For example, the realtime data feed may be a public financial wire service, such as might be available from the New York Stock Exchange, Reuters or Knight-Ridder, that provides users with the most recent prices for stocks and trades. It may be a private financial data source that distributes financial data within a particular business or institution, such as a bank. Or, it may be a source of monitoring and control data generated by a manufacturing process within a company.

Frequently, it is desirable to analyze the data available from such data feeds to make buy or sell decisions for financial instruments, to decide other financial and/or management related issues, or to control manufacturing processes. For this purpose, there are commercially available applications that are programmed or can be programmed to perform the required analysis using data gathered from those data feeds. For example, there are spreadsheet programs, such as 1-2-3 ™ marketed by Lotus Development Corporation, that provide such data analysis capability. Often it is also desirable, if not necessary, to perform the analysis of the data from the data feeds as rapidly as possible, even on a time scale approaching the speed at which the data changes. To accomplish this, others have provided interfaces which funnel the data coming from the data feed directly into the application where it can be analyzed.

SUMMARY OF THE INVENTION

In general, in one aspect, the invention is a realtime engine for interfacing one or more data feeds with an application where each of the one or more data feeds delivers realtime data for each member of an associated group of items that are available through the data feed. The interface includes means for caching the most recent data values received from a selected one of the one or more data feeds for at least some members of the associated group of items for the selected data feed; and means for sending at least some of the cached data values to the application in response to a request for updates.

Preferred embodiments include the following features. The realtime engine includes means for identifying a subset of the associated group of items for the selected data feed for which the application desires data. The subset identifies the members of the associated group for which the caching means caches the most recent data values. Also, the realtime engine includes means for determining which of the cached data values are different from data values for corresponding items last sent to the application. The sending means sends only those cached data values which are determined to be different. In addition, the realtime engine includes means for storing copies of the data values last sent to the application. The determining means compares contents of the storing means with contents of the caching means to determine which data values are different from those last sent to the application.

Furthermore, the caching means includes means for recording for each cached item whether it has been updated by the data feed since data values for those cached items were last sent to the application. The sending means sends only those cached data values which are identified by the recording means as having been updated. The realtime engine includes means for enabling the application to add members to and delete members from the identified subset.

One advantage of the invention is that it provides an intelligent interface between one or more data feeds and one or more instances of an application that desire data updates from the data feeds. The interface caches the most recent data values for a set of items identified by the application, it ignores updates not relating to the identified items, and it sends only the most recent data values for the identified items when polled by the application for updates. This relieves the application of the burden of having to process all updates arriving from a data feed for selected items and of having to filter out those updates for which it has no interest. Thus, the application is relieved of these computational burdens, thereby freeing the application (e.g., a spreadsheet) for other activities such as recalculation.

Another advantage is that the invention identifies only those items which have been updated since the last poll and does not send updates to the application for items which have not been updated since the last poll. Furthermore, the invention also identifies those items for which the data value has actually changed since the last poll, and sends updates to the application only for those items. Thus, the application need not waste time processing items whose data values have not actually changed.

Yet another advantage of the invention is that it also offers a filtering capability which screens out all data relating to items that are not of interest to the application and it sends for items of interest all data received from the data feed.

Other advantages and features will become apparent from the following description of the preferred embodiment and from the claims.

DESCRIPTION OF THE PREFERRED EMBODIMENT

FIG. 16 is a set of reader message buffers;

FIG. 21 is pseudo-code describing the initialization of the RTE process by the main thread;

FIG. 22 is pseudo-code describing the check for termination of the RTE process performed by the main thread;

FIG. 23 is pseudo-code describing the termination routine executed by the main thread when the RTE process is terminated;

FIG. 24 is pseudo-code describing the operation of the RTE private pipe thread;

FIG. 25 is pseudo-code describing the operation of the feed server pipe threads;

FIGS. 26a–b depict pseudo-code describing the operation of the updater thread;

FIG. 27 is pseudo-code describing the registration function available through the API;

FIG. 28 is pseudo-code describing the termination function available through the API;

FIG. 29 is pseudo-code describing the rte_getstdf function for getting information about the first alphabetical data feed name;

FIG. 30 is pseudo-code describing the rte_getnxtdf function for getting information about the next alphabetical data feed name;

FIG. 31 is pseudo-code describing the rte_getdf function for getting information about an identified data feed;

FIG. 32 is pseudo-code describing the rte_getfstfld function for getting information about the first alphabetical field name;

FIG. 33 is pseudo-code describing the rte_getnextfld function for getting information about the next alphabetical field name;

FIG. 34 is pseudo-code describing the rte_getfld function for getting information about an identified field;

FIG. 35 is pseudo-code describing the rte_openilist function for opening an application interest list;

FIGS. 36a–c depict pseudo-code describing the rte_addilist function for adding an item to the application interest list;

FIG. 37 is pseudo-code describing the rte_delikey function for deleting an item from the application interest list;

FIG. 38 is pseudo-code describing the rte_delifield function for deleting a field from the application interest list;

FIG. 39 is pseudo-code describing the rte_delilist function for deleting an application interest list;

FIGS. 40a–d depict pseudo-code describing the rte_closeilist function for closing an application interest list;

FIG. 41 is pseudo-code describing the openflist function for opening an application filter list;

FIGS. 42a–b depict pseudo-code describing the rte_addflist function for adding an item to the application filter list;

FIG. 43 is pseudo-code describing the rte_delfkey for deleting a key from the application filter list;

FIG. 44 is pseudo-code describing the rte_delffield function for deleting a field from the application filter list;

FIG. 45 is pseudo-code describing the rte_delflist function for deleting an application filter list;

FIGS. 46a–d depict pseudo-code describing the rte_closeflist function for closing an application filter list;

FIGS. 47a–b depict pseudo-code describing the rte_update function for polling an application interest list for updates; and FIG. 48 is pseudo-code describing the rte_read function for retrieving updates from the filter queues.

Structure and Operation

Figure 1:
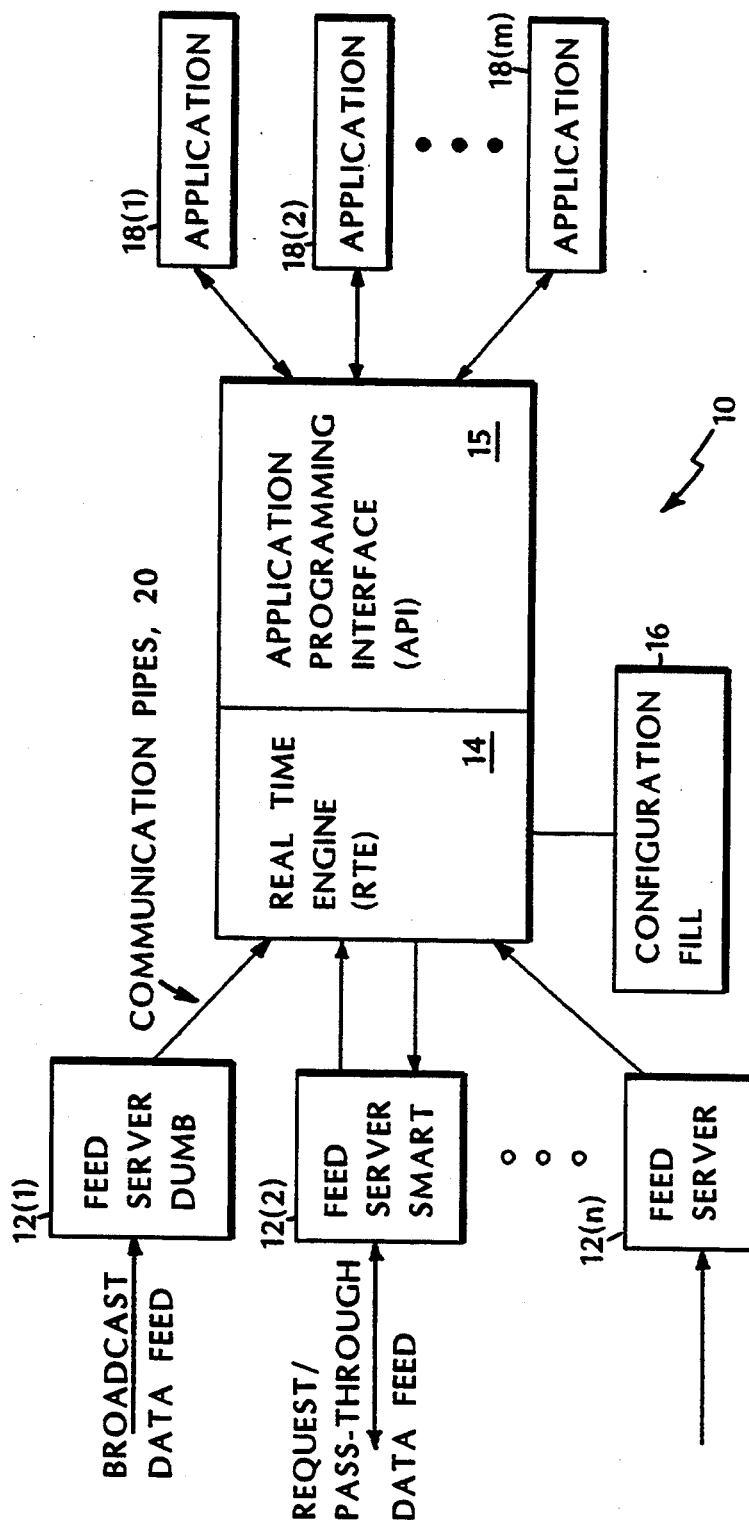
FIG. 1 is a block diagram of a realtime system.

Referring to FIG. 1, a realtime system 10 comprises one or more feed servers 12(1)–12(n) (referred to generally as feed servers 12), a Realtime Engine (RTE) 14, a feed configuration file 16, one or more instances of an application program 18(1)–18(m), such as Lotus 1-2-3 Release 3.0, and an application programming interface (API) 15, which provides a programming interface between an application and RTE 14. Each of these components is a separate process running on a user's PC which, in the described embodiment, employs an OS/2 operating system.

Feed servers 12 are programs which handle communications between an external data feed and RTE 14. RTE 14 supports two kinds of feed servers 12, namely, a dumb feed server 12(1) and a smart feed server 12(2). A dumb feed server processes a one-way broadcast type data feed. It translates the raw external data into update and refresh messages and feeds these to RTE 14. A smart feed server supports a request/pass-through data feed which accepts initial requests from RTE 14 for data items. The smart feed server implements two functions. Like the dumb feed server, it translates raw external data feed updates into update and refresh messages and feeds these to RTE 14. It also handles requests from RTE 14 to the data feed to add, refresh, or delete items.

A data feed may be any of a number of realtime data sources, i.e., sources which provide data as the data becomes available or close to the time at which the data is generated. For example, it may be a public financial news source, a private financial data source, a source of data and control information generated by a manufacturing process.

Feed servers 12 must satisfy at least two criteria. First, a feed server must be able to handle communications from the data feed to which it is connected, whether that be a device or a network wire. And second, a feed server must be able to translate data from the format provided by the data feed into the format required by RTE 14.

Feed configuration file 16 describes the properties of each of feed servers 12 connected to RTE 14. It uses a standard format to tell RTE 14 what feed servers 12 are included in realtime system 10; the names of communication pipes 20 that they use to send messages to the feed server; the field data types and fields for each key;

and, where applicable, the number of concurrently active keys allowed by the data feed.

Note a each smart feed server also requires a second pipe which is used to send messages to RTE. The name of the second pipe is predefined and is published by RTE.

Of the components within realtime system 10, RTE 14 must be run first. Typically, it is a detached process that runs automatically at start-up time (i.e., when the PC is booted). It can be run manually, however, at any time prior to running feed servers 12 or any application which makes requests of RTE 14. RTE 14 requires no screen display 2. However, if a screen display is available, RTE 14 only uses it when errors occur to display error messages.

As a rule, feed server(s) 12 are run next after RTE 14. In general, these programs also run as detached processes. Like RTE 14, feed servers 12 may be run automatically at start-up time as a convenience to the user or they may be run manually.

Finally, the user can run up to twelve instances of an application 18. Each application 18 provides its own interface to RTE 14. In the described embodiment, the instances of the application are spreadsheet programs.

To obtain real-time data, the user must define a set of 3 ranges for each group of real-time data desired. The 3 ranges contain: name of the data feed; a list of the keys (symbols) desired; a list of the fields desired. Up to ten of these groups can be defined for each worksheet file associated with the spreadhseet program. Once the worksheet in the application program is set up properly with the required information to determine the real-time data of interest, the user can begin updating the real-time data. This is done via API 15.

When realtime updating is begun, the following actions occur to initialize RTE 14 for updating the data in the worksheet. API 15 calls RTE 14 and passes a data structure which identifies all the elements in the real-time ranges which have been specified. RTE 14 keeps an in-memory database of all the elements (keys) requested by the user. If an element is new and unique, it is added to this database. RTE 14 also keeps track of which elements occur in which ranges so that the master database contains only unique elements and no duplicates. RTE 14 also keeps track of which elements are associated with a given instance of application program 18. If a smart feed server is used, then RTE 14 sends a "request add" message to the smart feed server for each new element (key) so the feed server will know that it now must send data for that new element. Finally, before updating begins, RTE 14 calls back to API 15 to write NA values for all the cells that are to be updated in real-time.

API 15 and RTE 14 have distinct responsibilities in getting real-time updates into application program 18. API 15 provides mechanisms enabling the application to select the data feeds from which it desires data, to identify the items for which it wants updates and to poll the RTE for updates of the identified set of items. RTE 14 is the policeman at the intersection between feed server(s) 12 and API 15. Independently of the communication between RTE 14 and API 15, RTE 14 maintains continuous communication with feed server(s) 12 to make sure the most recent data is being obtained and updated. This occurs even if the user is not running API 15. In performing this function, RTE 14 serializes the access to each of feed server(s) 12 up to the maximum of seven. To ensure that both processes can keep up with the arrival rate of the data, RTE 14 runs at time-critical priority and usually feed server(s) 12 run at the same priority. As data elements arrive from a feed server, RTE 14 looks up the element (key) in its in-memory database. If the data element does not exist in the in-memory database, then it isn't currently of interest to the user (i.e., it has not been registered or added by any application) and it is discarded. If the data element does exist in the in-memory database, then that data element is updated.

RTE 14 maintains counters and flags to provide four levels of checking to determine if any given data value has changed since the last update of that instance of an application 18. Only the most recent, changed values are written into an instance of application 18 when the application requests updates. The four levels of checking are:

1. Has a value for a given data feed been updated?
2. Has some field within a given key been updated?
3. Has a given field value been updated?
4. Has the data value for the field actually changed from the previous value that was written to the worksheet?

If updates have occurred since the last time updates were solicited, RTE 14 calls back to a function supplied by API 15 when the application requests updates. This function is called once for each cell in the worksheet whose value has changed and the new value is written to that cell.

When API 15 is terminated (and the user is still in application program 18), then real-time updates no longer occur in the worksheet. However, RTE 14 continues to receive data from feed server(s) 12 and it keeps the elements which still exist in its in-memory database updated with the most recent real-time data. This allows the user to resume updating at any time and quickly obtain current values for all elements which were previously being updated in real-time.

When an instance of application program 18 is terminated, all the elements associated with that instance of the application program which are not being referenced by any other instance of the application program are marked for deletion from the in-memory database of RTE 14. These elements will no longer receive updates, and they are deleted. In the case of a smart feed server, a delete request message will be sent for each element to be deleted so that the smart feed server will know to stop sending data for that element.

Figure 2:
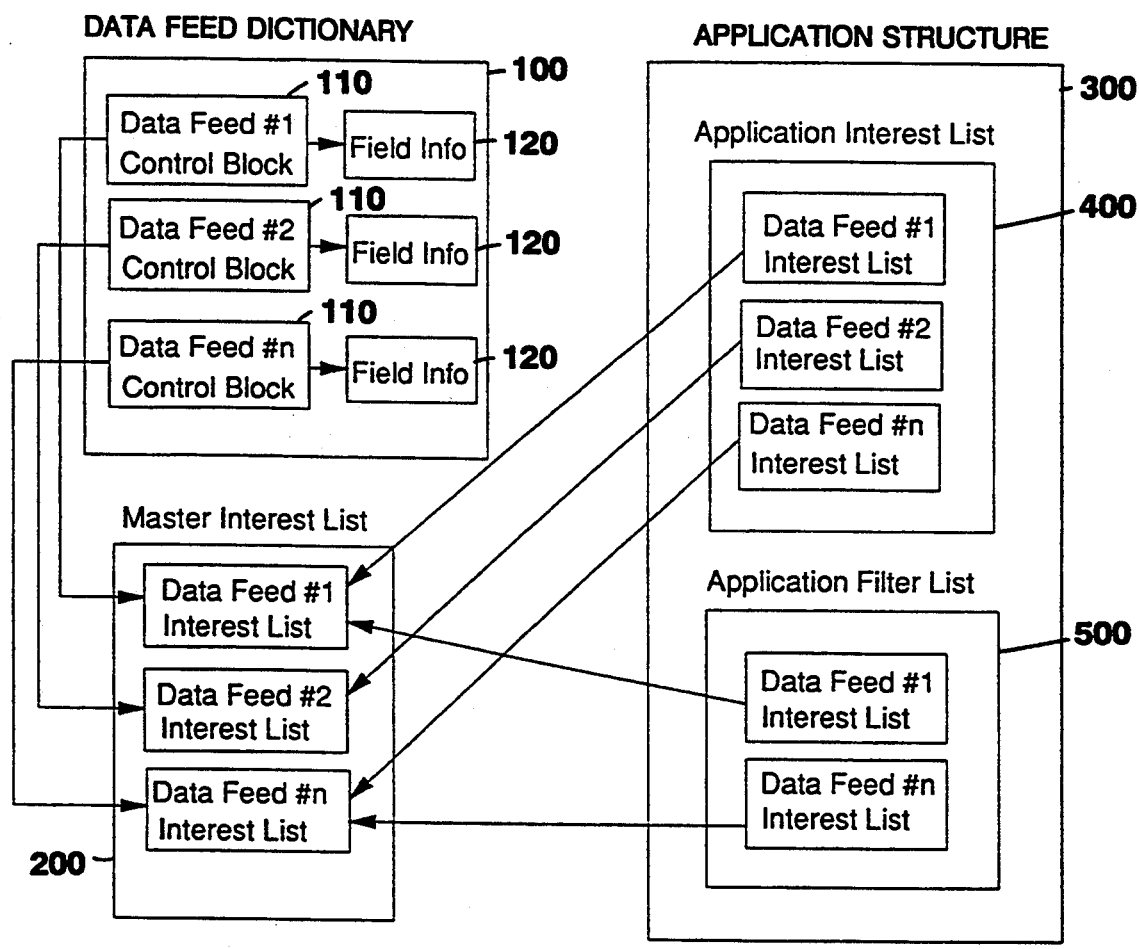
FIG. 2 is an overview of the three principle data structures within the realtime engine shown in FIG. 1.

FIG. 2 is an overview of the data structures used by RTE 14 to carry out the functions just described. RTE 14 includes a data feed dictionary structure 100, a master interest list structure 200, an application structure 400 that includes an application interest list structure 500 and an application filter list structure 600. Data feed dictionary structure 100 contains data feed control blocks 110 that store information about each of the data feeds that are connected to RTE 14. Most of the items in the data feed dictionary are statistics about the operation of the data feed. Each data feed control block 110, in turn, identifies a field information block 120 which describes all of the fields associated with that data feed.

Master interest list structure 200 contains all the records and fields requested by the user. It is essentially an in-memory database created from the items specified by the user in each of the applications (processes) being run. It is a union of all items requested by the user.

Application structure 300 is used to maintain the application information for RTE 14 and includes an application interest list structure 400 and an application filter list structure 500, for each instance of application program 18. Each application interest list structure 400 identifies the data feeds, the keys and the fields for which the relevant application wants the most current updates in response to its polling of RTE 14. Application filter list 500 identifies the data feeds, the keys and the fields for which the relevant application wants to receive all updates supplied by the data feed for identified items.

These and the underlying data structures which support them will now be described in greater detail.

Data Feed Structures

Figure 3:
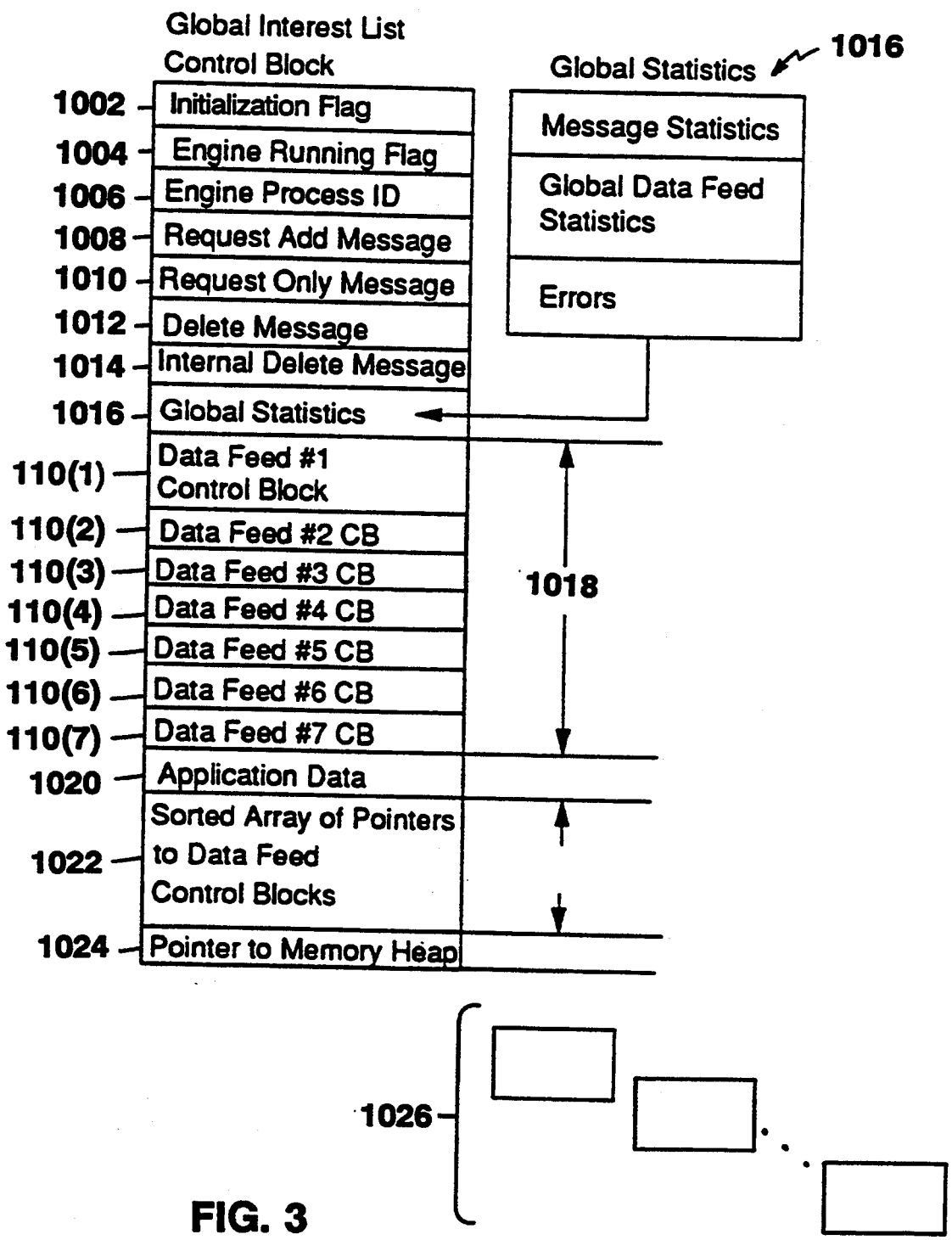
FIG. 3 shows the global interest list control block data structure.

Referring to FIG. 3, RTE 14 maintains one static instance of a global interest list block 1000, which is the main data structure containing general statistics and controlling all the data feeds for RTE 14. In general, it contains a variety of control information, a structure of global statistics, an array of data feed control blocks and a table for each process managed by RTE 14.

More specifically, global interest list block 1000 contains the following information. It includes two flags, namely, an initialization flag 1002 and an engine process running flag 1004, and it includes an engine process id 1006, which identifies the RTE process. Initialization flag 1002 indicates whether RTE 14 has been initialized and engine process running flag indicates whether the RTE process is running. If the RTE 14 has been initialized, flag 1002 is set to TRUE, otherwise it is FALSE. If the RTE process is running, engine running flag 1004 is set to TRUE, otherwise it is FALSE. Engine running flag 1004 is used to terminate RTE 14.

Block 1000 includes four message areas, three areas for storing messages that are to be sent to smart feed servers 12 and one area for storing messages that RTE 14 sends to itself. The four areas are a request add message area 1008 for storing request add messages, a request refresh message area 1010 for storing request only (also referred to as request refresh) messages, a delete message area 1012 for storing delete messages and an internal delete message area 1014 for storing internal delete messages.

Request add messages are used when a user adds new items (keys) to an interest list. Request refresh messages are used when a user adds new fields to items already in the interest list. Upon receipt of either a request add message or a request refresh message, the feed server sends a refresh message to RTE 14 for all fields of each item/key specified. Request delete messages are used when a user terminates an instance of the application program or when the user stops using the items/keys in an application. Finally, internal delete messages are used to delete items from the interest lists maintained by RTE 14.

Messages are stored into these areas during that phase of operation in which the user is adding items to, deleting items from or modifying items in any interest list used to identify items/keys for which an application desires update data. The messages stored in these areas are eventually sent to the appropriate feed server and/or to RTE 14.

Block 1000 includes a global statistics data structure 1016 which is used to record global statistics about the operation of RTE 14. This area is used primarily for monitoring the performance of RTE 14 and is not integral to its operation.

Block 1000 includes a data dictionary 1018 (which corresponds to data dictionary 100 of FIG. 2). Data dictionary 1018 is an array of seven data feed control blocks 110(1) through 110(7), one for each data feed that can be managed by RTE 14. As will be explained in greater detail shortly, the information stored in data dictionary 1018 describes the information that is available about the data feeds to which RTE 14 is connected.

After data dictionary 1018, there is a global application information data structure 1020 which is used for storing information about the instances of the application programs that are connected to RTE 14.

Next is a sorted array of pointers 1022 to data feed control blocks 110 in which data feed control blocks 110 are arranged in alphabetical order by name. The sorted array of pointers is used by cataloging functions available through API 15 to report the identity of data feeds to an application.

Finally, block 1000 includes a pointer 1024 to a memory heap 1026, which is a linked list of memory pages. This area is used for creating the interest list data structures which identify the keys and fields of interest to the instances of the application and which form the database of most recent values for those items. Pages are added to memory hap 1026 as they are needed.

Figure 4:
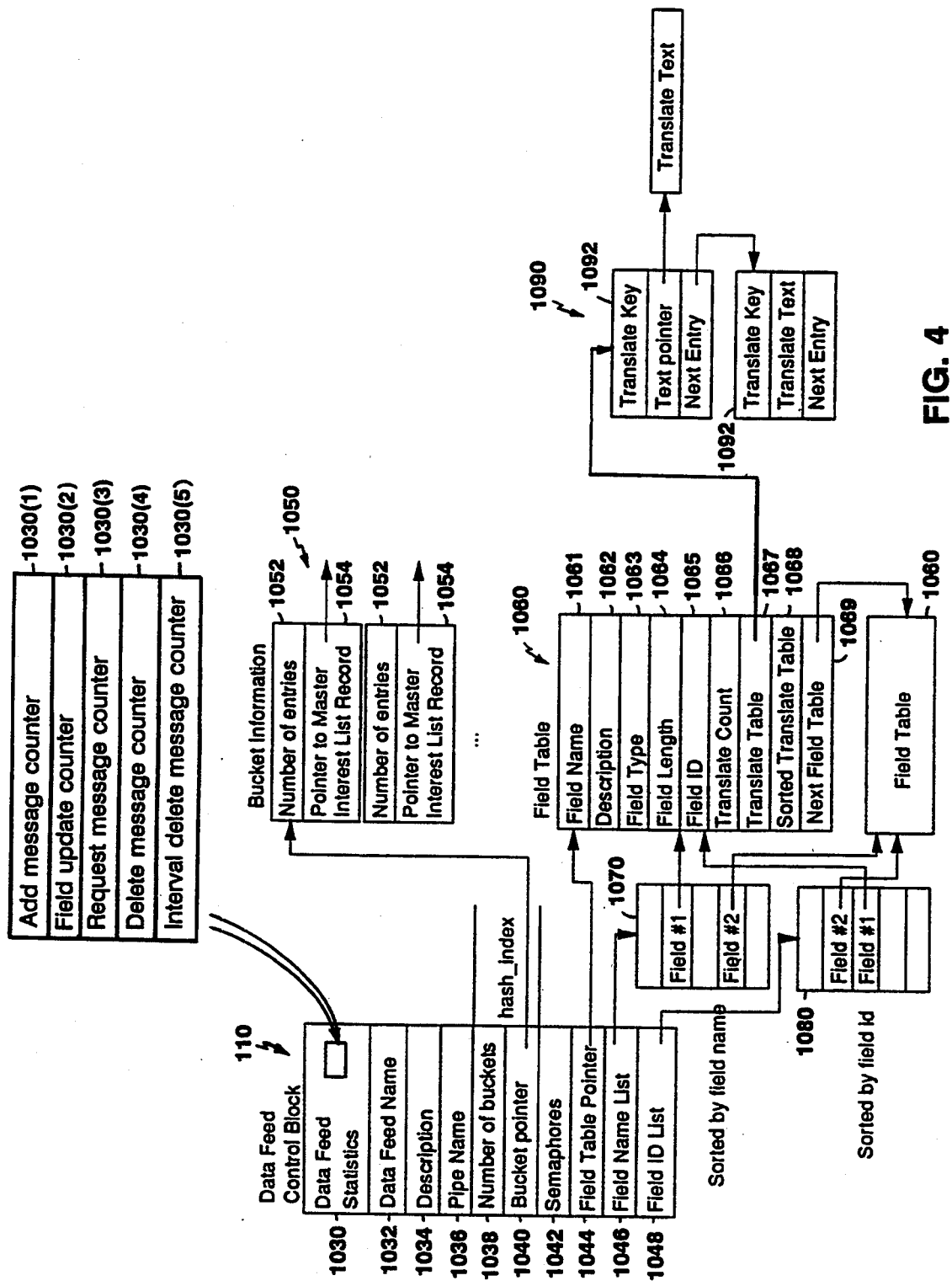
FIG. 4 shows the data feed control block data structure and related data structures.

FIG. 4 identifies the data structures that make up data dictionary 1018 within global interest list control block 1000. Each data feed control block 110 within data dictionary 1018 contains an area 1030 for storing statistics about the operation of the data feed. For example, data feed statistics area 1030 contains five counters: an add message counter 1030(1) for keeping track of the total number of add messages for the data feed; a field update counter 1030(2) for keeping track of the total number of field updates for that data feed; a request message counter 1030(3) for keeping track of the total number of request messages that are waiting to be sent to that data feed; a delete message counter 1030(4) for keeping track of the total number of delete messages that are pending for that data feed; and an internal delete message counter 1030(5) for keeping track of the total number of internal delete messages that are pending for that data feed.

Each data feed control block 110 also includes a field 1032 for the name of the data feed and a field 1034 for a description of the data feed. Both the data feed name and the description are supplied to RTE 14 by configuration file 16 (to be described). There is also a field 1036 for the name of the pipe to the feed server. Field 1036 is only used in the case of smart feed servers, in which case, the name of the pipe is supplied by configuration file 16.

Another portion of data feed control block 110 provides a connection into master interest list structure 200 (see FIG. 2) through a hash index that identifies a bucket information structure 1050. Recall that, master interest list structure 200 is the in-memory database containing all the records and fields requested by the user. Fields 1038 and 1040 of block 110 contain, respectively, a hash table structure specifying the number of buckets in the hash index and an array of pointers to the appropriate bucket information structures.

In the described embodiment, a standard hash algorithm is employed and the number of buckets is a prime number (e.g. 501). Using a cyclical redundancy code, the hash algorithm converts the key to a number and then computes that number modulo 501. The result identifies within an array of bucket information structures 1050 the particular one of such structures which contains a pointer 1054 to a master interest record 2000 (See FIG. 5) for that key. Since more than one key may yield the same bucket number, pointer 1054 may actually identify a linked list of master interest records 2000 for those keys. Each bucket information structure 1050 contains the number of entries in the linked list and pointer 1054 is to the first master interest record within the linked list.

Field 1042 holds a RAM semaphore used to control access to the named pipe for the data feed and another RAM semaphore used to control access to the data feed.

Field 1044 holds a pointer to the first member of a singly-linked list of field tables 1060 for this data feed. Each field table 1060 describes a particular field available through the data feed and the linked list includes field tables 1060 for all of the fields available through the data feed.

The last two fields hold pointers that provide other ways of accessing field tables within the linked list of field tables 1060. Field 1046 holds a pointer to a list of pointers 1070 to all of field tables 1060, sorted by field name, and field 1048 holds a pointer to a list of pointers 1080 to all of field tables 1060, sorted by field id.

FIG. 4 also shows the structure of field table 1060. All field tables 1060 are created from configuration file 16 which is read at the time RTE 14 is initialized. Each field table 1060 contains a text field name 1061 for the associated field, a field description 1062, a field data type 1063, an entry 1064 specifying the length of the field name, and a field ID 1065 as specified in configuration file 16.

There may be a translation table 1090 associated with each field table 1060. A translation table 1090, which contains one or more translation table entries 1092 linked together to form a singly-linked list, enables the RTE to translate a data value for a field into a text string identifying the field. If a translation table has been specified for the field, then field 1067 of table 1060 contains a pointer to the first translation table entry of translation table 1090 and field 1068 contains a pointer to a list of pointers to all translation table entries 1092, sorted by order of data value associated with the translation table entries. If no translation table has been specified, fields 1067 and 1068 contain NULL pointers.

Finally, field 1069 contains a pointer to the next field table 1060 in the linked list of field tables.

Referring to translation table 1090, each translation table entry 1092 contains a translate key 1094, which is a data value that is to be translated to text, a text pointer 1096 to the text string to which the data value will be translated, and a pointer 1098 to the next translation table entry 1092 in the linked list.

Master Interest List Data Structures

Figure 5:
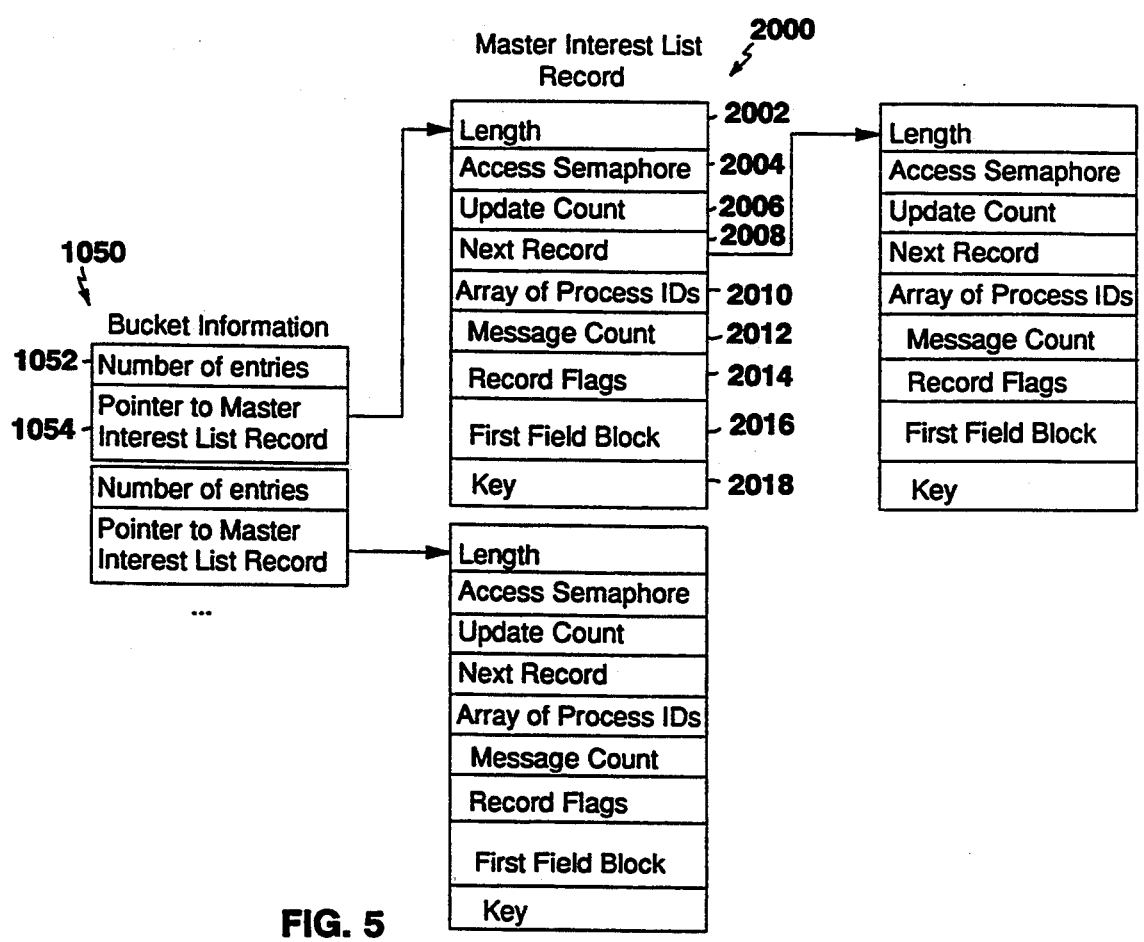
FIG. 5 shows the master interest list record data structure.

The master interest list structure that is accessible through the hash index of each data feed control block 110 will now be described. The master interest list structure is collection of master interest records 2000 such as are shown in FIG. 5 and which collectively represent a union of all items requested by the user. Master interest list records 2000 for each data feed are pointed to by a hash bucket based on the hash value of the record. When more than one record has the same hash value, then the records are linked in a singly linked list.

Each master interest list record 2000 is associated with a key that is identified in a key field 2018 located at the end of the record. The key is a variable length text field which is defined as a two element array (simply to align the structure on an even word boundary). The rest of record 2000 contains the following information.

Field 2002 contains the length of that record. Field 2004 contains a RAM semaphore for controlling access to the record. Field 2006 contains an update count which keeps track of the total number of changes that are made to the record. Field 2008 contains a pointer to the next master interest list record 2000 with the same hash value, thereby forming a linked list of all records 2000 for a given hash bucket.

Field 2010 contains an array of process ID's identifying all of the instances of the application program which are using the associated key. Field 2012 contains a message count which records the number of messages relating to this record which are to be sent to the smart feed server.

Field 2014 contains five record flags that reflect the status of messages for that record. They include a send add message flag, a send request refresh message flag, a send delete message flag, a send internal delete message flag, and a delete sent flag. Each of the first three flags, if TRUE, indicates that the corresponding message needs to be sent to the smart feed server (if FALSE, the message need not be sent). The fourth flag, if TRUE, indicates that an internal delete message needs to be sent to RTE 14 (if FALSE, it need not be sent). The delete sent message flag, if TRUE, indicates that a delete message has been sent to the smart feed server (if FALSE, none has been sent).

Figure 6:
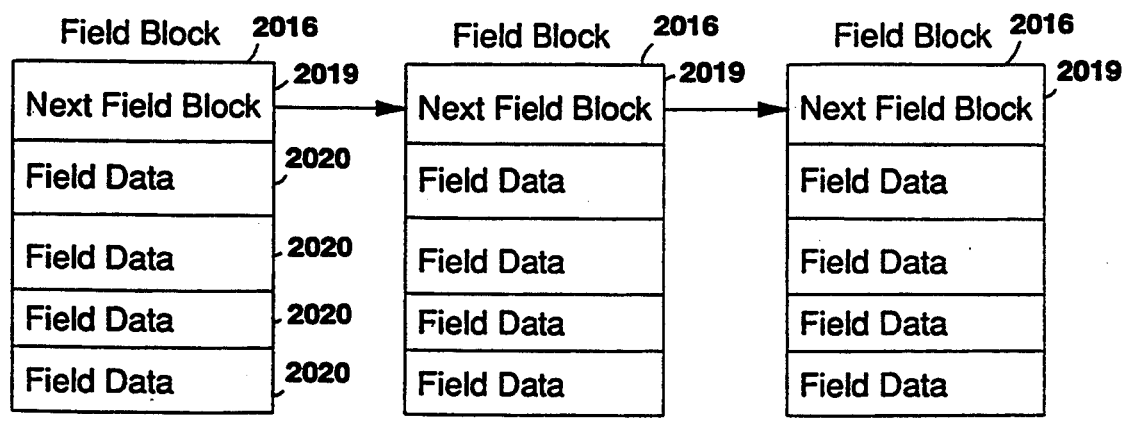
FIG. 6 shows a linked list of field block data structures that is referenced in the master interest list record.

Finally, each master interest list record 2000 also contains a field block 2016 that is a member of a singly-linked list of field blocks 2106 identifying the fields of the associated key that have been requested by the user. As is shown in FIG. 6, each field block 2016 contains a pointer 2019 to the next field block 2016 within the singly-linked list and it contains an array of four field data structures 2020. The value of pointer 2019 in the last field block of the list is NULL to indicate that no field blocks follow that one.

Figure 7:
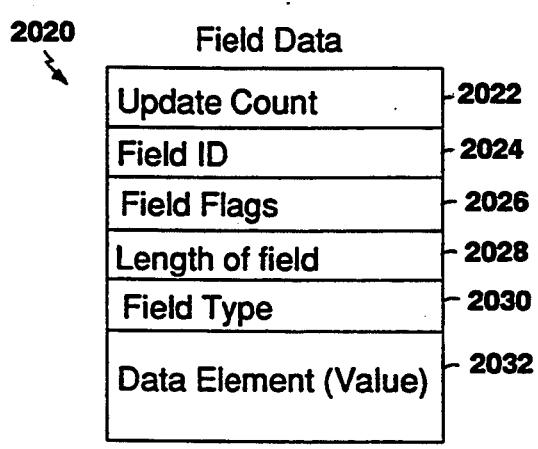
FIG. 7 is a field data structure which is part of the field block data structure of FIG. 6.

Referring to FIG. 7, each field data structure 2020 describes an individual field and its field value for a given record in the master interest list. It also contains an update count 2022 indicating how many times the field data value has been updated, a field ID 2024 identifying the field with which it is associated, a field length 2028 specifying the length of the field and a field type 2030 identifying the type of the field. Note that the update count 2022 is used during the previously described third level of checking that is used to identify the updates that are to be sent to the application.

Each field data structure 2020 also contains sixteen field flags 2026. Each of the first twelve field flags corresponds to a different one of the twelve possible instances of the application program which can be connected to the RTE. The correspondence of the first twelve flags is organized in the same order that the applications are identified in a global application information structure (to be described). A set flag indicates whether the corresponding application is "watching" this field (i.e., whether it has identified the field in a filter list as one for which it wants to receive all data that is supplied by the data feed).

The last four flags include a field-in-use flag, a field-no-data flag, a field updated flag, a new interest list field flag. The field-in-use flag, if TRUE, indicates that the field is currently in use. The field-in-use flag is set when an application uses the associated field data structure to add an item to the interest list. The field-no-data flag, if TRUE, indicates that there is no data in the field data structure. It is also set when an application uses the associated field data structure to add an item to the interest list. The field updated flag, if TRUE, indicates that new data for the field has been added. This flag is only used in field records that form part of the application interest list (as opposed to the master interest list) and it is set when the application polls the interest list for updates. Finally, the new interest list field flag, if TRUE, indicates that this is a new field. Like the field updated flag, the new interest list field flag is only used in field records that form part of the application interest list. The new interest list field flag, however, is set when the application adds a new item to the interest list.

Finally, data structure 2020 contains a data element 2032 that is the most recent data value received from the feed server.

Application Data Structures

The application data structures are used to maintain the application information for RTE 14. The application data structures contain the data values which have been sent to the application during the last update.

The overall arrangement of the application interest list is as follows. There is a single global application interest list structure 1020 (See FIGS. 3 and 8) which is part of global interest list control block 1000. It includes an instance of an application information structure 1202 (See FIGS. 8 and 9) for each application (process) that can be managed by RTE 14. The application information structures contain specific data about each application connected to RTE 14. Each application information structure also provides access to a group of interest list records 3100 (See FIG. 11), one for each item (key) specified by the user in an application. Each interest list record 3100, in turn, points back to a corresponding master interest list record 2000 within the master interest list and it also contains pointer to a linked list of interest list field structures 3200, one for each of the fields specified by the user for the application (see FIG. 12). Each interest list field structure 3200 contains the data value for that field which was previously sent to the application and it also points back to the corresponding field block 2016 within a field data structure 2020 (See FIGS. 5, 6 and 7) that is maintained in the master interest list and which contains the most recent data value received from the feed server. These structures and their relationship to each other will now be described in greater detail.

Figure 8:
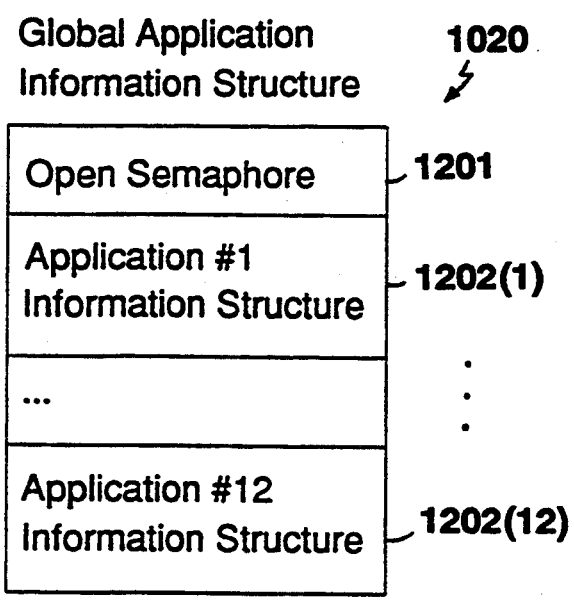
FIG. 8 is a global application information structure.

Referring to FIG. 8, global application information structure 1020 stores global information for all applications which can be managed by RTE 14. Global application information structure 1020 contains an array of application information structures 1202 (1) through 1202(12) (referred to generally as application information structures 1202) which contain information for each individual application which can be connected to RTE 14. It also contains an open semaphore 1201, which is a RAM semaphore for controlling access to application information structures 1202. Only one application at a time can change an application interest list or a filter list. Open semaphore 1201 is used to lock out all other applications.

Figure 9:
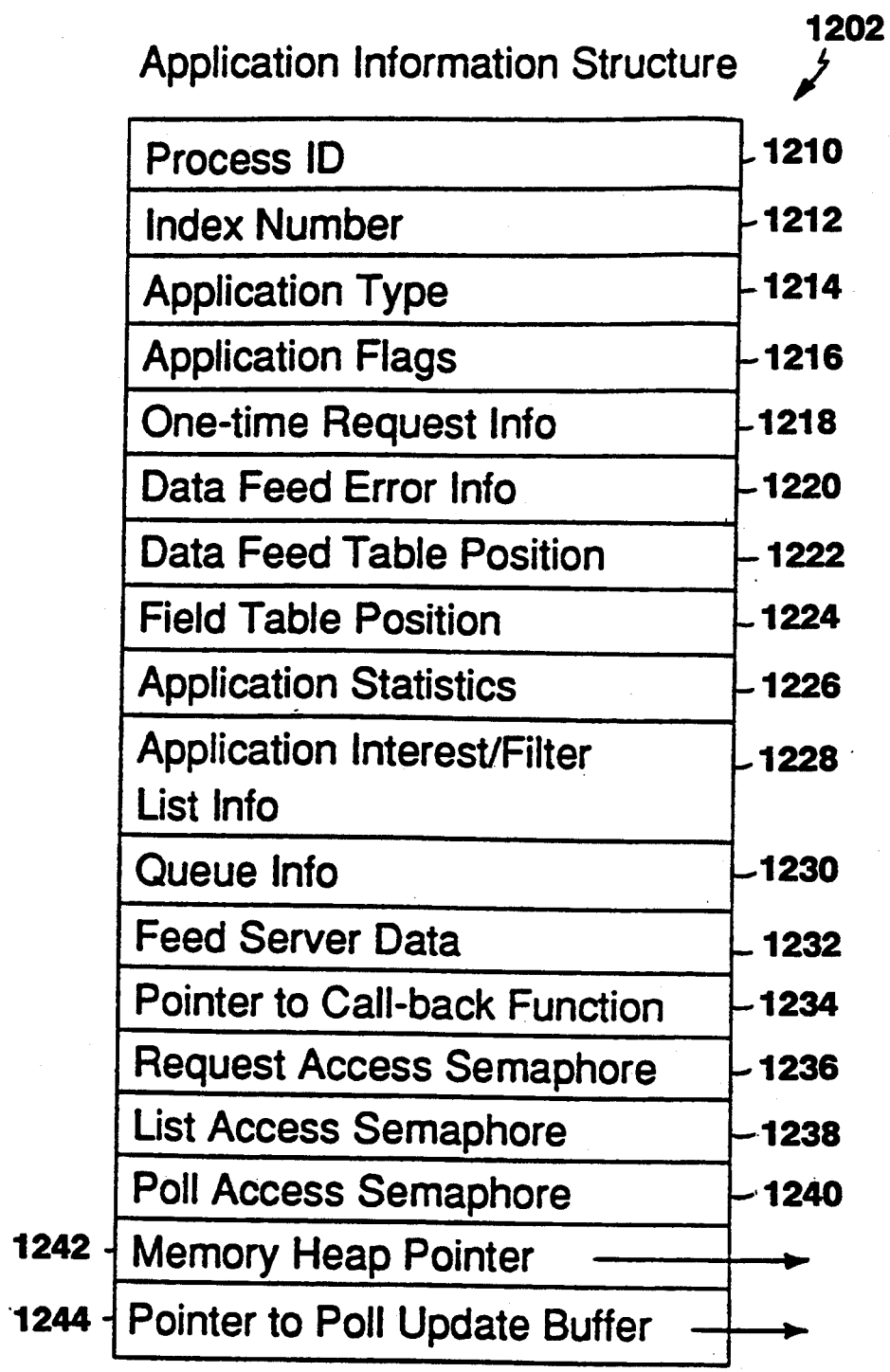
FIG. 9 is an application information structure.

Referring to FIG. 9, each application information structure 1202 stores information identifying the application to which it is assigned, namely, a process ID 1210, a self-referencing index number 1212 identifying its position in the array of application information structures, and an application type specifier 1214. There are three application types, namely, a polling application which only receives updates in response to a poll of RTE 14, a queuing application which receives all updates relating to identified items, and a combination polling/queuing application which polls for updates of some items and receives all updates of other items. As will become apparent during the following description, a polling application uses an application interest list to identify the items for which data is desired. Whereas, a queuing application uses an application filter list to identify the items for which data is desired.

Each application information structure 1202 also contains a set of application flags 1216. Among the flags is an interest-list-open flag for indicating that an application has opened its interest list, a filter-list-open flag for indicating that an application has opened its filter list, a pipes-open flag for indicating that pipes are open to the application, a no-write-pipe flag for indicating whether to write messages to the pipe and a request-pending flag for indicating whether a one time request to a data feed server by the application is pending. If request pending flag is TRUE, then another field 1218 of application information structure 1202 contains a one-time request structure that holds a copy of the pending request.

The pipes-open flag is set when the application is in the process of closing its interest list or filter list and it is used by RTE termination function to clean up and make sure that all pipes are properly closed. This flag is turned off when the pipes are closed after successfully completing the closing of the interest list or the filter list. The no-pipe-write flag is set when the application is in the process of closing its interest list or filter list.

In field 1220 of application information structure 1202 there is a data feed access error structure which maintains information about errors that have occurred when the application tries to access the data feeds which are available.

There are two data structures within structure 1202 that support browsing functions available to the user for identifying the data feeds that are connected to RTE 14 and the keys and fields available through those data feeds. More specifically, field 1222 contains a data structure for remembering the current position of the application in the sorted data array of pointers to data feed control blocks (see field 1022 of global interest list control block 1000 in FIG. 3) and field 1224 contains another data structure for remembering the current position of the application in the sorted field table (see structure 1070 in FIG. 4).

In field 1226 there is an application statistics structure for recording information relating to the interaction of RTE 14 and the application. Among the items kept in that structure are the current number of memory pages allocated, the total number of memory pages allocated, assorted statistics on interest list and filter list activity, the number of one time requests, statistics on the application's polling activity, etc. Much of this information is maintained for monitoring and debugging purposes.

In field 1228 there is an array of application interest-/filter list information structures 3000 (See FIG. 10) for the application's interest list and filter list information. In the described embodiment, there are seven such application interest/filter list information structures 3000, one for each possible data feed.

Field 1230 contains information about the queue used for queuing (i.e., filter list) applications.

Field 1232 contains an array of feed server data structures identifying the feed servers to which the application is connected. Each feed server data structure includes a handle used for identifying the connection to the feed server, the name of the feed server's pipe to which RTE 14 is connected (i.e., only if it is a smart feed server), and a pointer to the data feed control block associated with the data feed (feed server) identified by this structure.

Field 1234 contains a pointer to a 'C' function name which may be called to write updates back to the application when the application request updates.

The next three fields contain RAM semaphores for controlling access to various data structures. In particular, there is a request access semaphore 1236 for controlling request access to application information structure 1202. There is a list access semaphore 1238 for controlling access to the interest list for the application. List access semaphore 1238 serializes access to an application interest list for multiple threads of an application process thereby preventing more than one application or application thread from trying to change an interest list at the same time. Finally, there is a poll access semaphore 1240 for controlling polling access to the application interest lists.

Field 1242 contains a pointer to a memory heap from which memory is allocated for the interest lists and the filter lists which are associated with this application.

Field 1244 contains a pointer to a buffer of polling update information that is to be sent to the application in response to a poll for updates.

Interest/Filter List Information Structures

Figure 10:
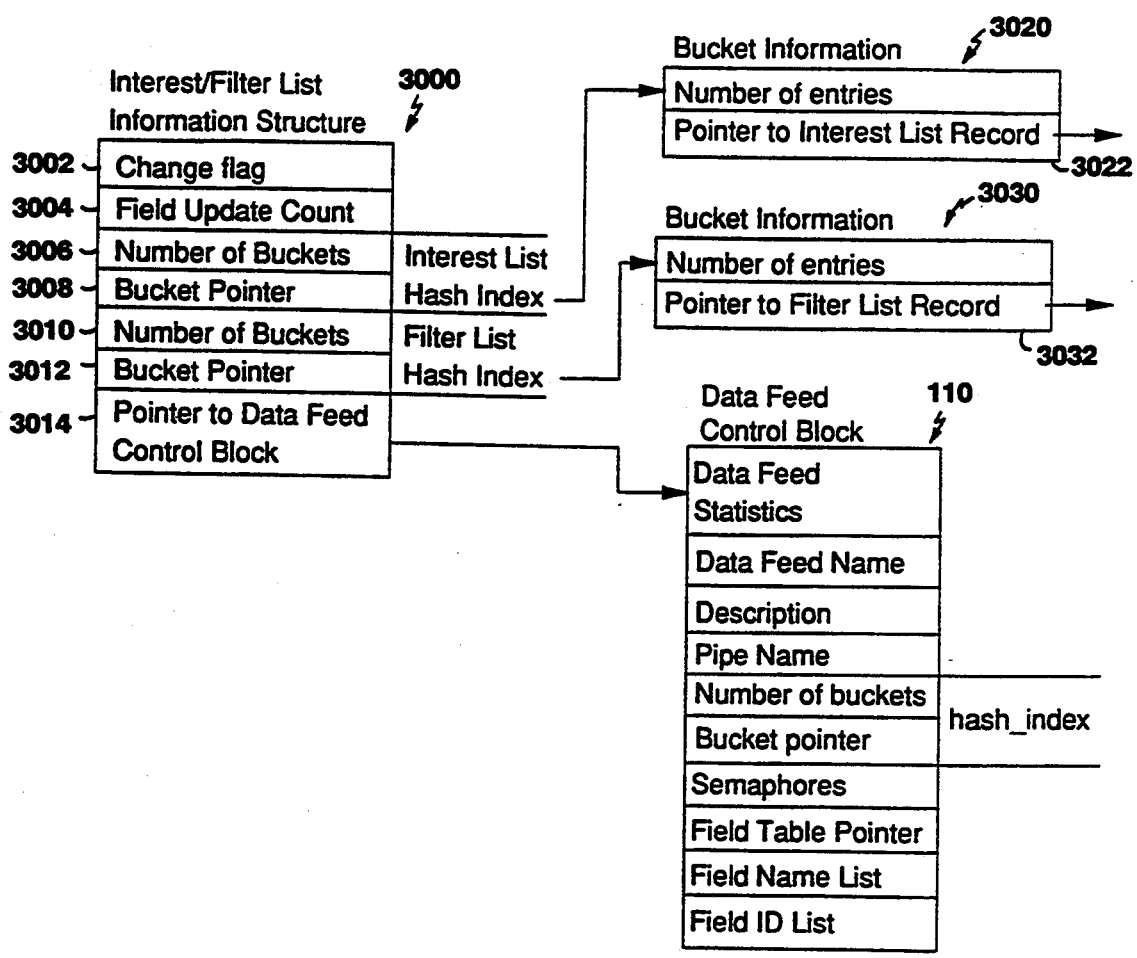
FIG. 10 shows an interest/filter list information structure which is part of the application information structure.

Referring to FIG. 10, each application information structure includes an array of seven interest/filter list information structures 3000. These structures are the application's window into the master interest list and they identify all of the keys and fields for which the application wants data from the associated feed servers.

Each interest/filter list information structure 3000 includes a change flag 3002 which indicates whether updates need be made to the application. Change flag 3002 is a boolean value that is set to TRUE when an item identified by the application (i.e., an item in the master interest list) has been updated by the data feed. When the value is FALSE, none of the items in the master interest list has changed and therefore, no updates need be made to the application. This provides a first level of checking for determining when updates need to be made to the application.

Structure 3000 includes a field update count 3004 which keeps track of the number of field updates which have occurred for this data feed. This number is used during polling to determine whether the application interest list is current with the master interest list.

There are two hash indexes that are accessible through structure 3000, namely, an interest list hash index and a filter list hash index. The interest list hash index provides access to a series of linked interest list records 3100 (See FIG. 11). The filter list hash index provides access to a series of linked filter list records 3300 (see FIG. 13). Each of interest list records 3100 and each of filter list records 3300, in turn, points back into the master interest list. In this way, each key need only be maintained in one place, namely, within the master interest list.

Fields 3006 and 3008 contain, respectively, a hash table structure specifying the number of buckets in the interest list hash index and an array of pointers to bucket information structures 3020. Fields 3010 and 3012 contain, respectively, a hash table structure specifying the number of buckets in the filter list hash index and an array of pointers to bucket information structures 3030. The interest list hash index identifies within the array of bucket information structures 3020 the particular one of such structures which contains a pointer 3022 to an interest list record 3100 (See FIG. 11) for that key. Similarly, the filter list hash index identifies within the array of bucket information structures 3030 the particular one of such structures which contains a pointer 3032 to a filter list record 3300 for that key (see FIG. 13). Since more than one key may yield the same bucket number, pointers 3022 and 3032 may actually identify a linked list of records for those keys. Each bucket information structure 3020 and 3030 therefore contains the number of entries in the linked list and pointers 3022 and 3032 identifies the first record within the linked list. The same hash algorithm as was previously mentioned is used to convert the key to a number identifying the appropriate one of bucket structures 3020 or 3030.

Finally, field 3014 contains a pointer to the data feed control block 110 that is associated with the interest/filter list information structure 3000.

Interest List Records

Figure 11:
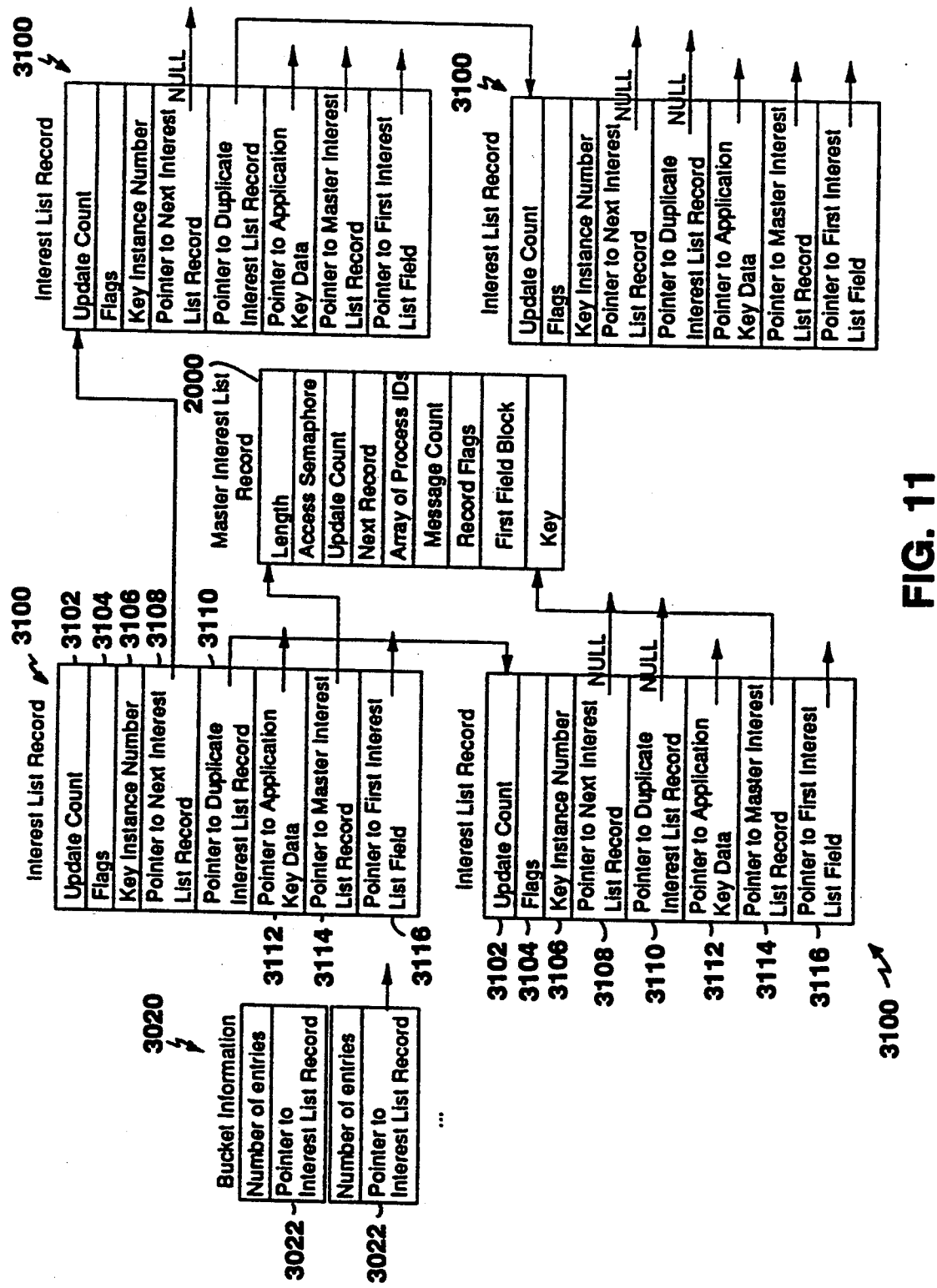
FIG. 11 shows several interest list records and their relationship to a master interest list record.

Referring to FIG. 11, interest list records 3100 are used to manage each key and all that key's associated fields, as specified for a given set of items within the application worksheet (i.e., a given instance of the key). These records identify the keys and fields for which the application wants updates when it polls its interest list. There is one interest list record 3100 for each key specified by the user in a polling application. There is a singly-linked list of these structures for each unique key in the application, each member of this list representing a different instance of that key. In addition, keys which yield identical hash values are also connected in a singly-linked list forming a duplicate hash value chain.

For clarification, note that unique keys generally hash to unique values. Sometimes, however, unique keys hash to the same value. The records for these keys are linked in a hash chain. Duplicate instances of a key will also produce the same hash values. The records for these keys are linked in a duplicate chain.

Each interest list record 3100 contains an update count 3102 which tracks the number of updates which have been made to the record. This number is used during polling to perform the second level of checking to determine whether the application interest list record is current with the corresponding master interest list record.

Each interest list record 3100 also contains a set of flags 3104 among which is a change flag and a delete flag. The change flag is set to TRUE to indicate that it is a new record or that a new field has been added to an existing record. A change flag which is FALSE indicates that no new record or field has been added. When the application polls its interest list for updates, it resets the change flag to FALSE. The delete flag marks the record for deletion. The application sets this flag to TRUE when it deletes an interest list item or when it deletes its entire interest list.

Since there may be multiple instances of a record (i.e, "duplicates" of the same key), record 3100 also includes a key instance number 3106 identifying the instance to which it corresponds. Multiple instances could exist, for example, if a spreadsheet application requested key data for more than one location in the spreadsheet.

Field 3108 contains a pointer to the next interest list record 3100 in the hash table chain, i.e., the singly-linked list of interest list records 3100 for the different keys that yield the same hash value. If no other such keys exist, the pointer in field 3108 is a NULL pointer.

Field 3110 contains a pointer to the next instance of the interest list record 3100 (i.e, its "duplicate"). If there are no duplicates or if the interest list record 3100 is the last member of the linked list of duplicates, then the pointer in field 3110 is a NULL pointer. For all instances below the first instance in this linked list, field 3108 contains a NULL pointer. That is, only the first instance in this linked list points to another member of the hash chain.

Field 3112 contains a pointer to an area for storing application key data. This area is for use by the application. Whatever information is stored in this area is passed back to the application when an update involving this interest list record occurs. The data stored in this area may be, for example, positional information that identifies where in the application the key data is to be used.

Field 3114 contains a pointer to the master interest list record 2000 which matches this interest list record (i.e., the master interest list record assigned to the same key). Among other things, this pointer identifies the key with which the interest list record is associated so only one instance of the key is maintained for all applications.

Figure 12:
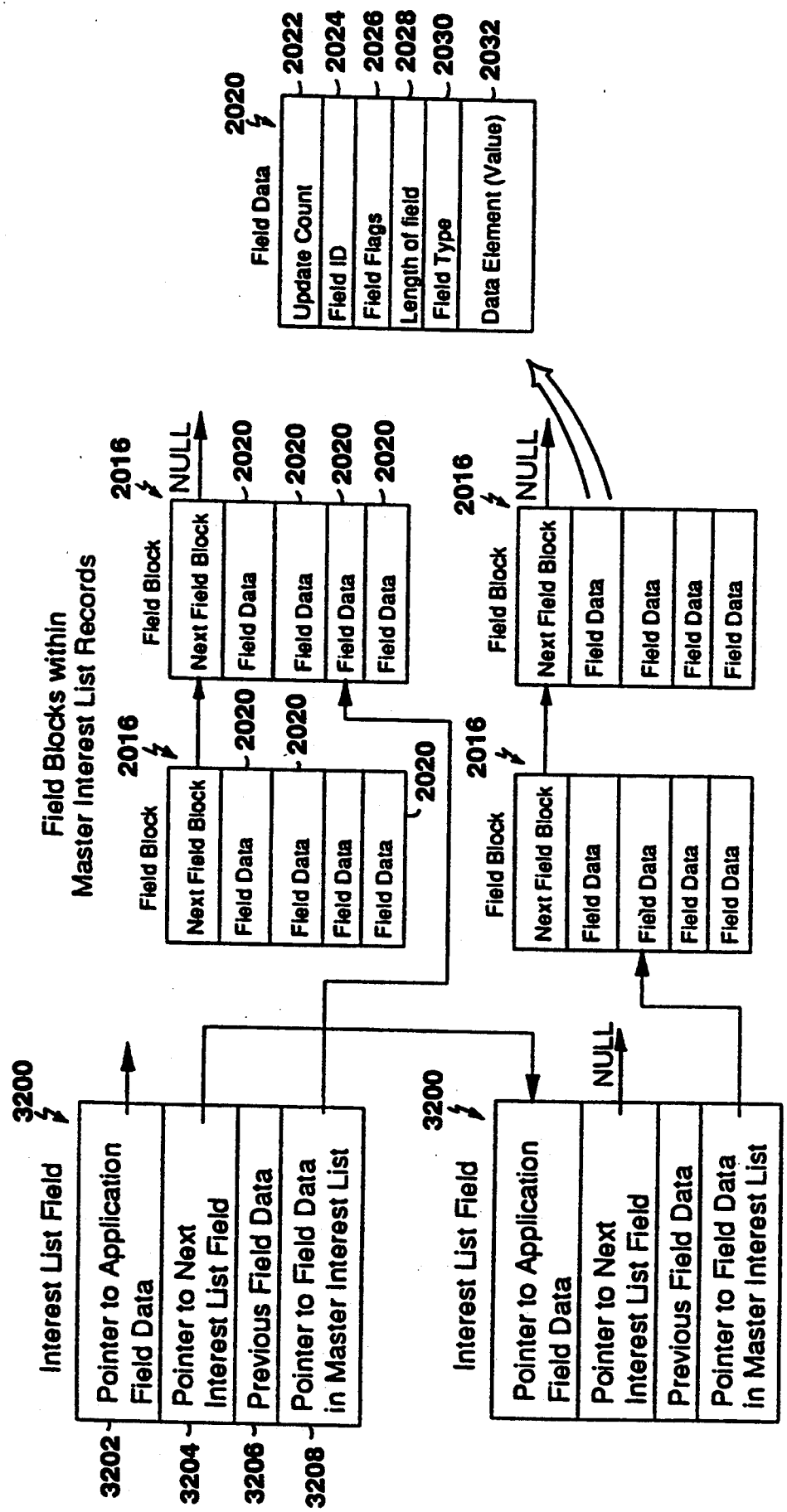
FIG. 12 shows two interest list field structures and their relationship to field block data structures within the master interest list.

The last field of interest list record 3100 (i.e., field 3116) contains a pointer to the first interest list field structure 3200 for this record (see FIG. 12).

Interest List Field Structures

Referring to FIG. 12, interest list field structures are used to manage each field requested for a given item (key). There is one interest list field structure 3200 for each field requested by the user. If more than one field is requested for a given key, the corresponding interest list field structures 3200 are connected in a singly-linked list.

Field 3202 of interest list field structure 3200 includes a pointer to a private data area for storing application field data. This is a private data area owned by the application. The information stored in this area is passed back to the application along with the updated data for this field. If, for example, the application is a spreadsheet, it may contain the sheet, row, and column location of the field in the spreadsheet.

Field 3204 contains a pointer to the next interest list field structure 3200 associated with the same instance of the key, thereby connecting this structure into the singly-linked list of all field structures for the key.

Field 3206 contains a previous field data structure which holds a copy of the last field data value that was written to the application. Indeed, when the data element in field data structure 2020 is written to the application, the contents of the field data structure 2020 are also written into the previous field data structure found in field 3206. In this way, the application interest list remembers the data value that was last sent to the application.

Note, however, that some of the field flags 2026 in the application interest list version of field data structure 2020 are used differently. Recall that there are four flags, namely, twelve application filter list flags, a field-in-use flag, a field-no-data flag, a field updated flag, and a new interest list flag. The field-in-use flag is not used for application interest list records, whereas, the field-no-data flag and the new interest list flags are only used by application interest list records. The field updated flag is used to indicate whether there is new data for the field. It is cleared when the application polls the interest list. The new interest list flag is used to indicate whether the field is new. It is set when a new item is added to the application interest list by the application.

The last field of interest list field structure 3200 (i.e., field 3208) contains a pointer to the corresponding field data structure in the master interest list. That is, field 3208 identifies the field data structure within the master interest list which contains the most recent value received from the feed server for this field.

Filter List Records

Figure 13:
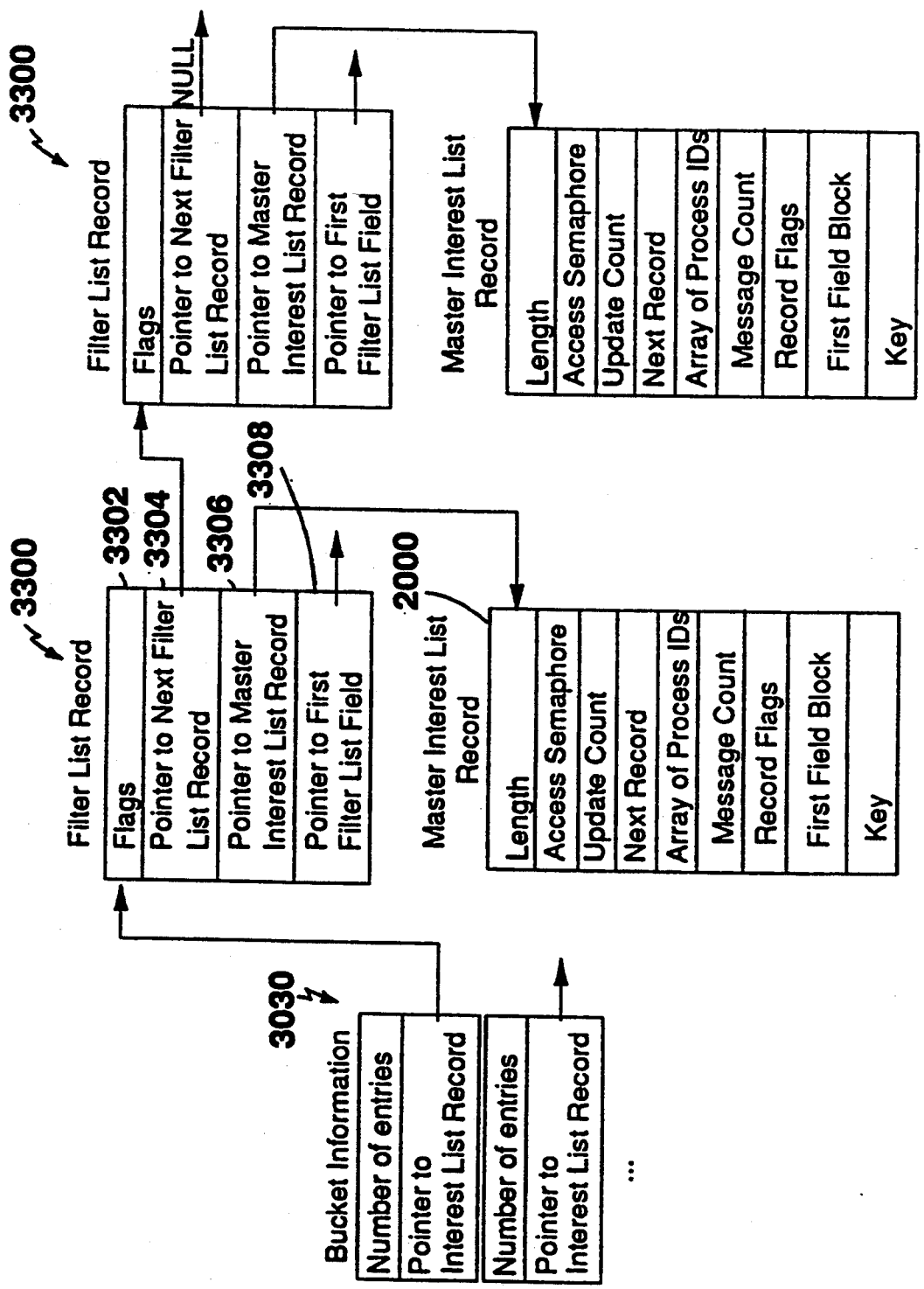
FIG. 13 shows two filter list records and their relationship to corresponding master interest list records.

Referring to FIG. 13, filter list records 3300 manage the keys and fields for which data is desired by a queuing application. There is one filter list record 3300 for each key specified by the user in the queuing application. If there is more than one key that yields the same hash value, then the associated filter list records 3200 for those keys are connected in a singly-linked list, as in the application interest list.

Each filter list record 3300 includes flags 3302 among which there is a delete flag. The delete flag is used to mark the record for deletion and is set when the application either deletes a filter list item or deletes an entire filter list.

Field 3304 of record 3300 contains a pointer to the next filter list record in the hash table chain. Multiple filter list records will exist if more than one key produces the same hash value.

Field 3306 contains a pointer to the record in the master interest list which matches with this one. That is, it points to the master interest list record 2000 which is assigned to the same key.

Field 3308 contains a pointer to the first filter list field structure 3400 (See FIG. 14) for this record.

Filter List Field Structures

Figure 14:
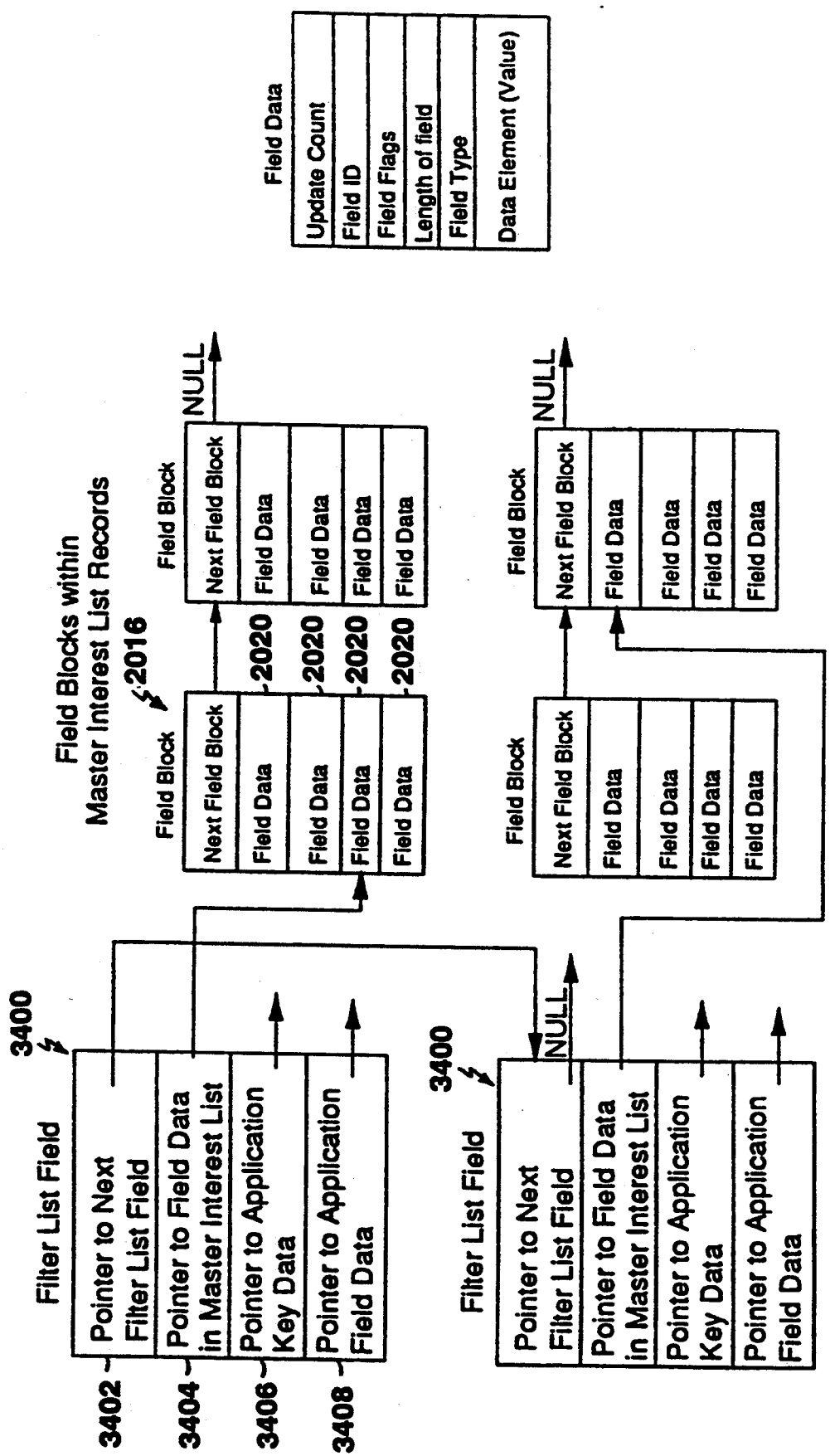
FIG. 14 shows two filter list field structures and their relationship to field block data structures within the master interest list.

Referring to FIG. 14, there is one filter list field structure 3400 for each field specified by the user for the given item (key) in the application. If more than one field is requested for a given key, the corresponding filter list field structures 3400 are connected in a singly-linked list.

Each filter list field structure 3400 includes fields 3402 through 3408. Field 3402 contains a pointer to the next filter list field structure 3402, thereby forming a singly-linked list of all field structures 3400 for that key.

Field 3404 contains a pointer to the corresponding field data structure 2020 in the master interest list.

The last two fields (i.e., field 3406 and 3408) contain pointers to private data areas owned by the application. The area identified by the pointer in field 3406 is associated with the record (key) for this field and the area identified by the pointer in field 3408 is associated with this particular field. These data areas may be used for any information desired by the application.

Queue Information Structures

Figure 15:
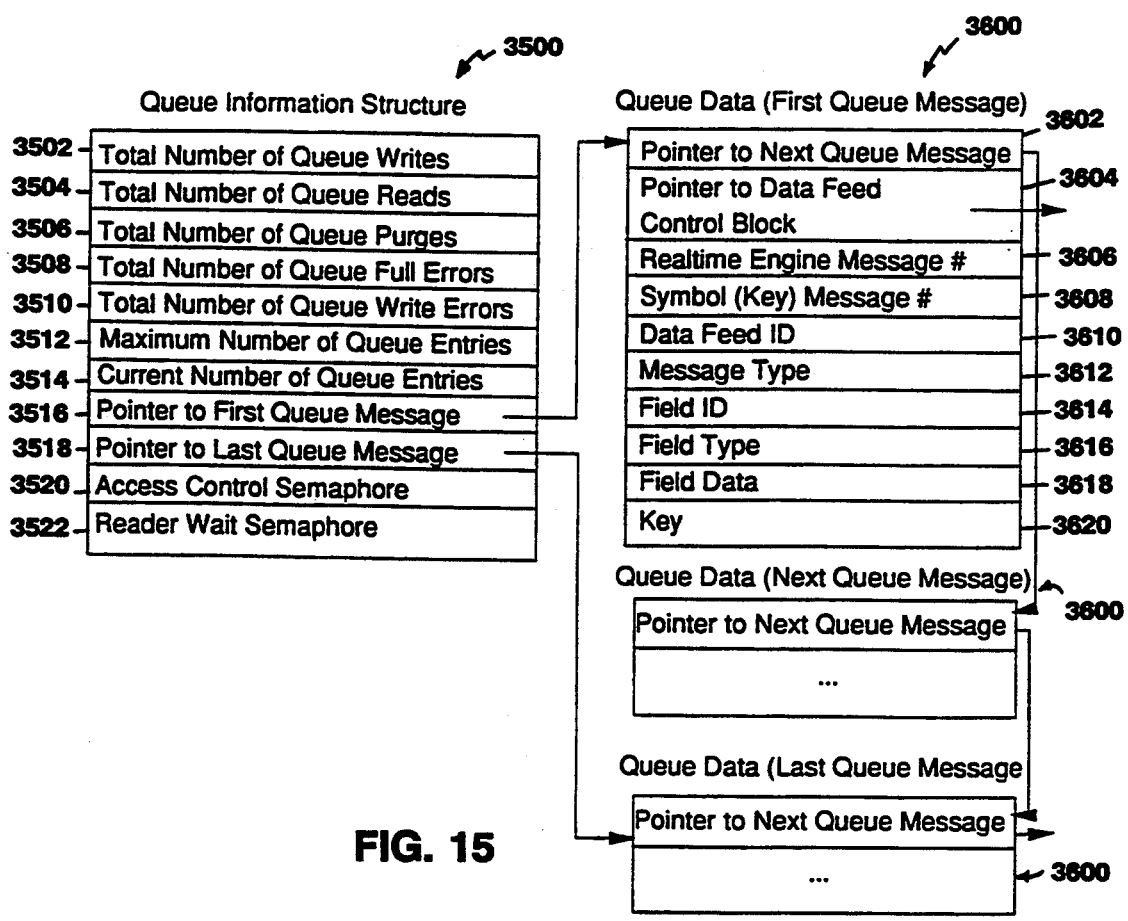
FIG. 15 shows a queue information structure and a queue data structure.

RTE 14 maintains structures for holding data messages that are to be passed to queuing applications. The data messages transfer all data from the feed server for fields identified in the application filter list. Referring to FIG. 15, these structures include a queue information structure 3500 and a linked list (i.e., a queue) of queue data structures 3600.

Queue information structure 3500 includes fields 3502 through 3522. Fields 3502 through 3512 contain the following information: the total number of queue messages added to the queue; the total number of queue messages read from the queue; the total number of times that the queue has been purged; the total number of queue full errors which have occurred; the total number of queue write errors which have occurred; the maximum number of queue messages which can be contained in the queue; and the total number of queue messages which currently exist in the queue.

Fields 3516 and 3518 contain pointers, respectively, to the first and the last queue data structure 3600 in the queue.

Structure 3500 also contains two semaphores. Field 3520 contains a control access semaphore for controlling access to the queue. And field 3522 contains a reader wait semaphore for controlling reading of the queue.

Queue Data Structures

Queue data structures 3600 are used internally by RTE 14 to pass update information to queueing applications. These structures are connected in a singly-linked list up to the maximum number of queue messages (elements) which are allowed.

Queue data structure 3600 includes fields 3602 through 3620. Field 3602 contains a pointer to the next queue data structure 3600 in the queue, forming the singly-linked list of queue data structures 3600. The remainder of the fields are for information describing the contents of the message.

Field 3604 contains a pointer to the data feed control block associated with this queue message.

Field 3606 contains a unique message number assigned by RTE 14 used to identify all related items that are part of a single update message.

Field 3608 contains a sequence number for the specific key identified in this message.

Field 3610 contains the data feed id number.

Field 3612 contains the message type identifier.

Field 3614 contains the field ID for the message.

Field 3616 contains the field type for the message.

Field 3618 contains the field data value for the message.

Field 3620 contains the key for the message.

RTE Engine Process Private Data Structures

The data structures described in this section are used internally by the RTE process for handling communication with feed servers. These structures are used by the RTE process algorithms to be described in a subsequent section about the operation of RTE.

Reader Message Buffers

Referring to FIG. 16, there is one reader message buffer 3700 for each pipe connected to RTE 14. That is, there is a buffer for each feed server reader and an additional buffer for the private pipe used within RTE.

Each of these message buffers 3700 is intended to contain a single message which is read from a corresponding pipe. When a message is read from a pipe, it is first placed in the appropriate one of message buffers 3700 before being moved (packetized) into the larger message buffers within the ring of buffers described in the following section. The set of message buffers 3700 is implemented as a single global variable which is a 2-dimensional array. Conceptually, each row of the array corresponds to a message buffer 3700 for a particular pipe and each column corresponds to a position within the message buffer.

Ring of Message Buffers

Figure 17:
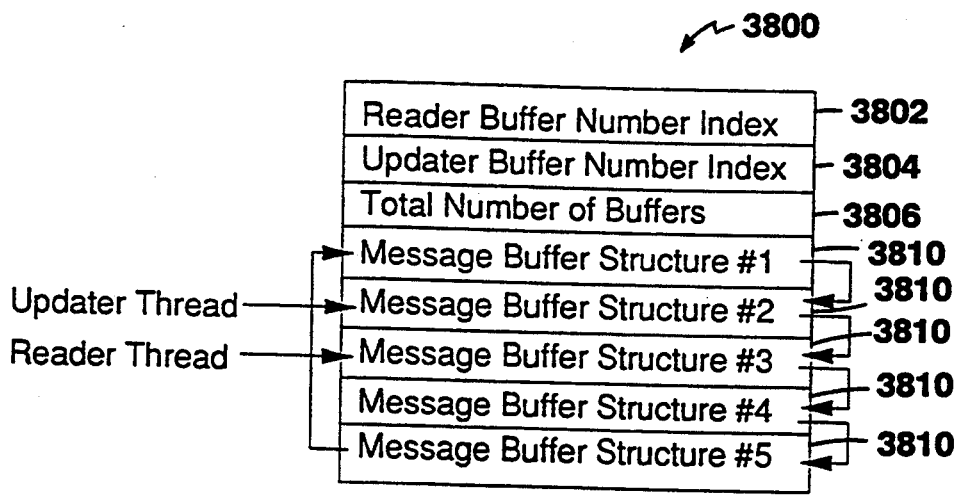
FIG. 17 is a ring of message buffer structures.

Referring to FIG. 17, a ring 3800 of message buffer structures 3810 is used to collect individual messages into packets before they are applied to the master interest list. The reader threads (to be described) build the message buffer packets. When a given buffer in ring 3800 fills or times out, it is then released to the updater thread (also to be described) so the messages can be applied to the master interest list.

In the described embodiment, ring 3800 includes five message buffer structures 3810 numbered from one to five and it includes a field 3806 which specifies the total number of these buffers in ring 3800. To control access to buffers 3810, ring 3800 also includes a reader buffer number index 3802 for keeping track of the number of buffer structure 3810 being accessed by a reader thread (i.e. this is the current buffer number being filled with messages). And it includes an updater buffer number index 3804 for keeping track of the number of buffer structure 3810 being accessed by the updater thread (i.e. this is the current buffer number being applied to the master interest list).

Message Buffer Structures

Figure 18:
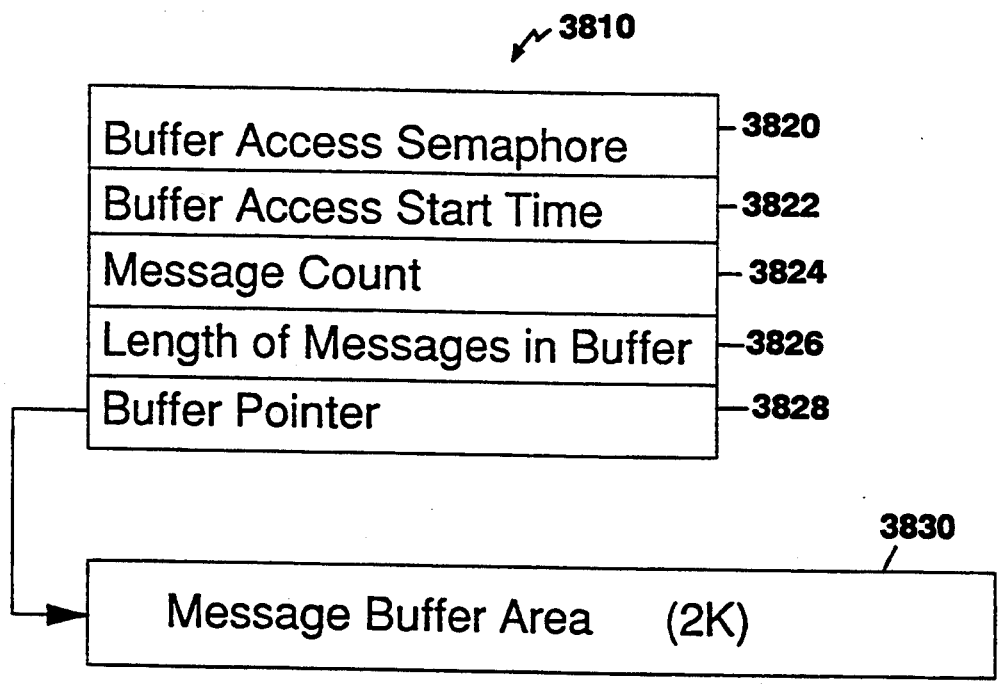
FIG. 18 is a message buffer structure.

Referring to FIG. 18, each message buffer structure 3810 includes fields 3820 through 3828. Field 3828 contains a pointer to a message buffer area 3830, which is a 2K byte memory location for storing the actual messages. To control access to buffer area 3830, structure 3810 includes a buffer access semaphore 3820.

Field 3822 contains a buffer access start time which is the starting time when the buffer began to be used. When the current time minus the start time is greater than a preselected timeout (e.g., 100 ms), then the buffer is released from the reader threads to the updater thread so that messages contained therein may be sent to update the master interest list. Field 3824 contains the number of messages in buffer area 3830 and field 3826 contains the length of all messages in this buffer.

The Feed Configuration File

Feed configuration file 16 is a text file that consists of a feed server description for each feed server in use. (Each feed server describes the properties of a data feed.) Each feed server description consists of the following parameters:
 database name;
 database description;
 database identification code;
 database pipe name;
 maximum concurrent keys; and
 database key size.

The database name is an ASCII string of up to sixteen bytes that identifies the database to both RTE and the end user (i.e., the applications). The database description is an ASCII string of up to 50 bytes that describes the database to the end user. RTE uses the database identification code to determine which data feed (and, hence, feed server) is the source of a message it receives. The database identification code is an integer that can be any value 0 to 255. In addition, each database identification code in RTE message headers matches a corresponding database identification code in the feed configuration file; and each database identification code in the feed configuration file is unique.

The database pipe name identifies the named pipe that the RTE opens to communicate with a smart feed server. If a database pipe name is specified, the RTE opens the pipe, sends request/delete messages to the feed server, and closes the pipe after transmitting the messages. In the case of a dumb feed server, the RTE does not open a pipe to the feed server, so there is no database pipe name. If no database pipe name is specified, the RTE assumes the feed server is dumb, and does not attempt to request data from it. The pipe name follows the OS/2 naming conventions for named pipes. (Note that a predefined pipe name is used by both dumb and smart feed servers to send messages to the RTE.)

The maximum concurrent keys parameter tells the RTE the limit on the number of updating items the feed server can support. The RTE keeps a cache of the number of items requested from each feed server. If a limit is specified and reached, the RTE stops forwarding data request messages to the feed server and returns an error to the application.

The database key size parameter specifies the maximum size of the unique key that identifies each database item to the RTE and to the end user. The key is always a string value whose length ranges from 1 to 253.

Each feed server description in feed configuration file 14 also contains a data dictionary. Each data dictionary consists of all the fields and their properties that can be transmitted by the feed server. The data dictionary includes for each field, a field name, a field description, a field identification code, and a field data type. The field name is an ASCII string of up to 16 bytes that identifies the field to the RTE and to the end user. The field description is an ASCII string of up to 50 bytes that describes the field to the end user. The field identification codes identify the fields sent in the feed server messages. As with the database identification codes described above, each field identification code in a feed server message matches a corresponding field identification code in the feed configuration file and each field identification code is unique for that feed server. The field identification code can be any number from 0 to 65535.

The field data type describes the data type of a field. The data types include, for example, short fraction data, long fraction data, double precision floating point data, short integer data, unsigned short integer data, long integer data, unsigned long integer data, time data, date data, byte data, and string data. For string data there is also a maximum field length specified. The definition of each of these data types follows:

(1) Short fraction data is six bytes in length and the short fraction field has two parts, a 32 bit signed numerator and a 16 bit unsigned denominator. The short fraction field is used to send floating point numbers whose denominator is $<=65535$. The sign of the numerator determines the sign of the entire number. Most fractional data can be sent with the short fraction data type.

(2) Long fraction data is eight bytes in length and the long fraction field has two parts, a 32 bit signed numerator and a 32 bit signed denominator. The long fraction field is used to send floating point numbers which cannot be sent using the short fraction data type described above. The sign of the numerator or denominator determines the sign of the entire number.

(3) Double precision data is eight bytes in length, and is in IEEE standard format. The value range is 1.7E-308 to 1.7E+308 (15 digit precision).

(4) Short integer data is two bytes in length. The value range is $-32768$ to 32767.

(5) Unsigned short integer data is two bytes in length. The value range is 0 to 65535.

(6) Long integer data is four bytes in length. The value range is $-2147483648$ to 2147483647.

(7) Unsigned long integer data is four bytes in length. The value range is 0 to 4294967295.

(8) Time data is transmitted by means of a unsigned long integer. The value represents the number of seconds since midnight, where a value of 1 is 00:00:01 (12:00:01) A.M.

(9) Date data is transmitted by means of an unsigned long integer. The value represents the number of days since Dec. 30, 1899, where day 0 is Dec. 30, 1899.

(10) Byte data is transmitted by means of an unsigned short integer. Only the low order eight bits are referenced. All byte data is treated as unsigned; the value range is from 0 to 255.

(11) String data fields have three parts, a length byte, the actual string text and a zero (null) termination byte. The length byte count indicates the length of the string; including the length of the string, the length of the length byte itself, and the zero (null) termination byte at the end of the string.

For fields of certain data types, configuration file 16 also includes field translation tables. The translation table follows immediately after the data dictionary information for the field. Field translation tables are used for those fields that translate to a longer string of text. For example, the single byte code N for a field EXCHANGE might translate to the string "New York Stock Exchange".

RTE Messages

All RTE messages have two components, namely, a message header and message data. Their contents depend upon the type of feed server. Message headers identify the message type. They contain at least four fields: (1) message length; (2) version number; (3) database identification code; and (4) message type. The message length field indicates the length of the entire message in bytes, including the length of the message length field itself. The version number field contains the current version number. The database identification code field contains the identification code of the feed server and it matches the database identification codes defined in the feed configuration file. The message type field identifies the type of message sent.

There are two types of messages, namely, update/refresh messages and request messages. All feed servers use update and refresh messages to send updates to the RTE. Smart feed servers also receive request messages from the RTE. Update messages send data changes from feed servers to the RTE, and always relay new data. Refresh messages are also transmitted from feed servers to the RTE and serve to refresh data fields for items specified in interest lists. The data in refresh messages may or may not be new.

Request-add messages are sent when a user adds new items (keys) to the interest list. Upon receipt of a request-add message, the feed server should send a refresh message for all fields of each item/key requested. Request-refresh messages are sent whenever the RTE needs a refresh message for one or more specific keys. Upon receipt of a request-refresh message, the feed server should send a refresh message for all fields of each item/key requested. Request-delete messages are sent when a user terminates an instance of the application, or when a user stops using the items/keys in an application. When an instance of an application is terminated, all items/keys not in use by another instance are deleted.

Update and Refresh Message Data Format

Figure 19:
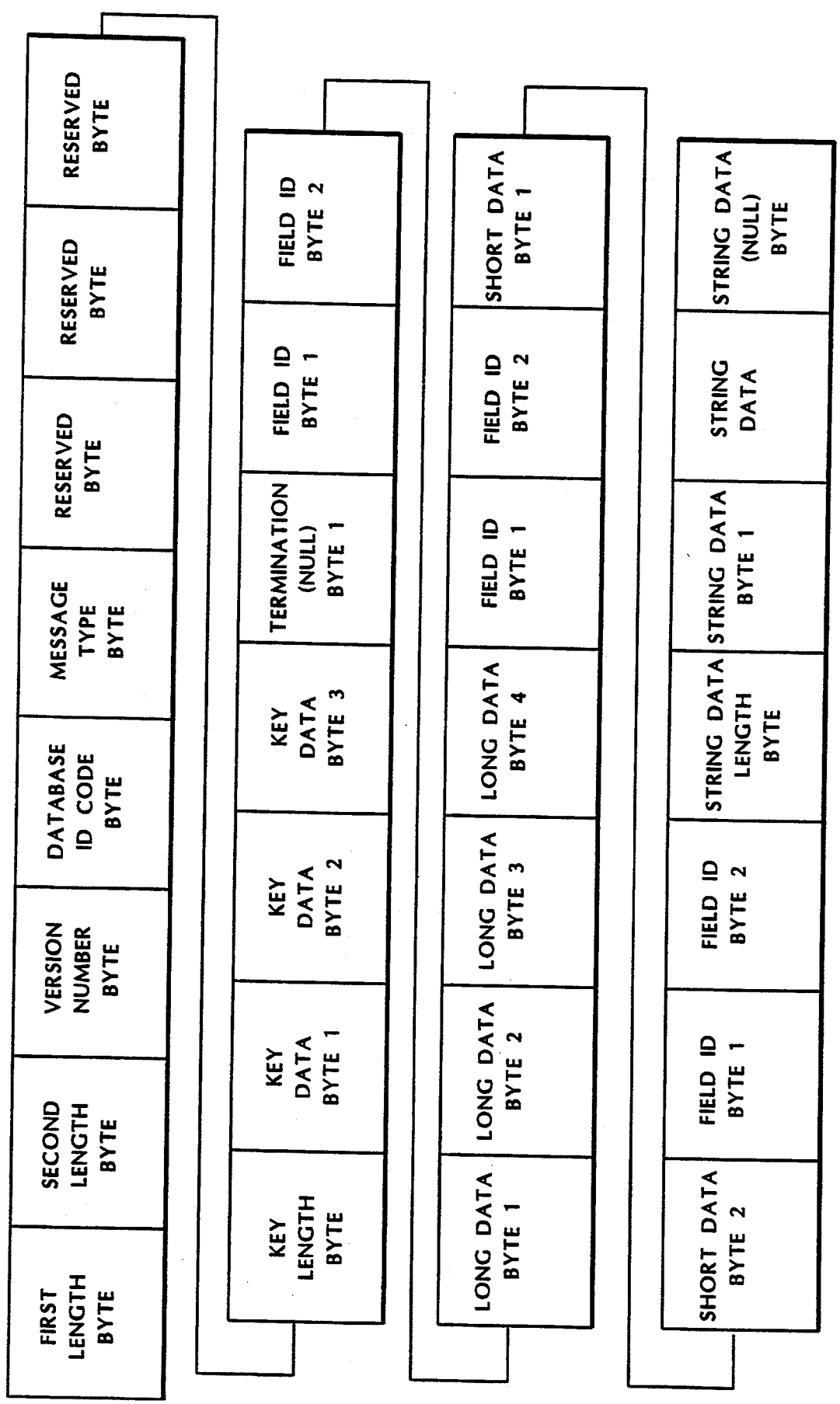
FIG. 19 shows the format of an update/refresh message.

The message data areas of update and refresh messages have identical formats. Messages sent from the feed server to the RTE have the following two components: key data and data field(s). The format of a RTE update/refresh message is shown in FIG. 19. There is a unique key associated with each update message sent by a feed server. The key follows the message header and is an ASCII string, which identifies the item to be updated. The format of the key is: length byte, ASCII key string, and termination byte. The first byte of the key specifies the length of the key. The length includes itself, the string length of the ASCII key string key, and the termination (null) byte at the end of the key. All keys are sent as ASCII strings. The ASCII key string is the key identification code by which end users identify items of interest. The termination byte, which is a binary zero (null) byte, must terminate every key. The termination byte is counted in the length byte that precedes the ASCII key string.

The data field(s) component of the message is of variable length and has a variable number of data fields. Each data field has two parts, a field identification code and actual field data. The field identification code identifies the field to the RTE and matches the field identification code specified in the feed configuration file. The field data portion contains the data that is applied to the RTE. The field data sent in the message matches the data type specified in the feed configuration file for the field identification code being processed.

Request Message Data Format

Figure 20:
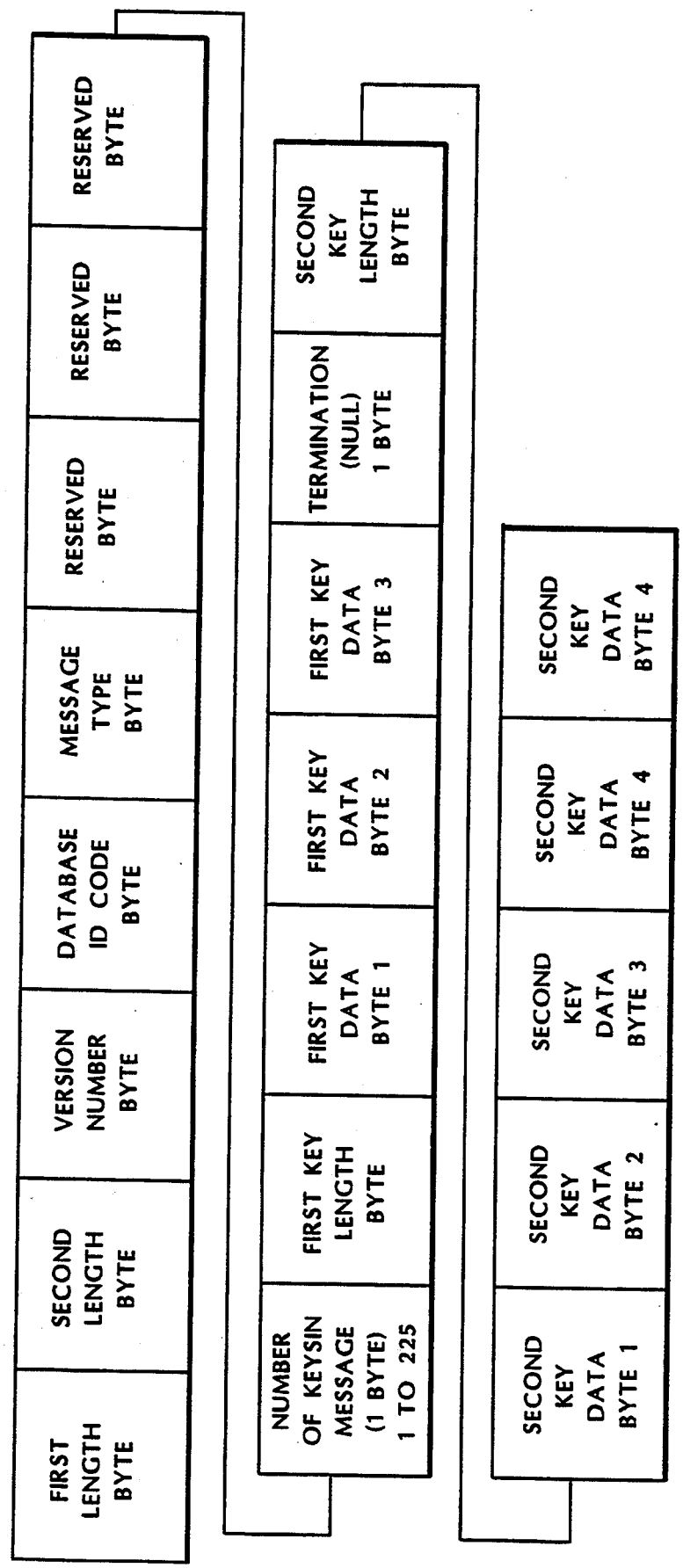
FIG. 20 shows the format of a request message.

The request messages inform the smart server that the user is requesting an action on one or more keys. The smart server responds to these messages by adding, refreshing, or deleting key(s), and forwarding any necessary updates to the RTE. As shown in FIG. 20, the data portion of a request message contains at least two items. The first item is the number of keys that are contained in the message, the second item is the first key in the message. Subsequent items are for all other keys in the message. The number of keys data item is a one byte count of the number of keys contained in the message. The maximum number of keys that can be sent in one message is 255. The key is an ASCII string that identifies item(s) of interest to the end user. The format of the key is: length byte; ASCII key string; and termination byte. The first byte of the key, the length byte, specifies the length of the key, which includes itself, the string length of the ASCII key string key, and the termination (null) byte at the end of the key. All keys are sent as ASCII strings which the end user uses to identify items of interest. The termination byte is a binary zero (null) byte which terminates every key.

Realtime Engine Process Algorithms

The RTE process is a single OS/2 process composed of a total of ten threads or paths of execution that run concurrently. There is a main thread, a thread for a RTE private pipe, seven threads for seven possible feed server pipes, and an updater thread. The processing of each of these threads will now be described in detail.

The figures for the algorithms described in this section contain pseudo-code descriptions of the salient features of their operation. For the most part those pseudo-code descriptions are self explanatory, thus for many of the algorithms, rather than repeating what should already be apparent from those figures, only such commentary shall be provided as may be useful in clarifying the meaning of certain steps and data manipulations that are identified in the pseudo-code.

Thread 1: Main Thread

The main thread of the realtime engine process is responsible for initializing the RTE process, checking for termination of the RTE process, and terminating the RTE process. Referring to FIG. 21, during initialization RTE 14 creates a RTE Process system semaphore (by setting engine running flag 1004 in global interest list control block 1000 of FIG. 3) that is used to prevent more than one RTE process from being run at one time. Once the semaphore is created, the main thread sits on this semaphore until it is cleared. When the main thread detects that the semaphore has been cleared, it terminates the RTE process. While the semaphore is set, no other RTE processes can be created.

After the system semaphore is created, the RTE checks initialization flag 1002 (see FIG. 3) to determine whether initialization had been previously performed. If initialization has not yet occurred, the RTE reads the RTE configuration file 16 and builds the data structures for all the data feeds and fields which are described in the configuration file. These are primarily the data structures shown in FIGS. 3 and 4.

A private shared memory pool is initialized during this phase (step 4100 of FIG. 21) and it is identified by the pointer to memory heap in field 1024 of global interest list control block 1000. As the configuration file is being read, pages are added to this memory heap as needed for the data structures being built. When an application calls the API to establish a connection to the RTE at a later time, this private shared memory is mapped into the application's address space.

When the data dictionary is created, the memory for its hash table index is also allocated. The pointers to the master interest list that are stored in that index are all initially set to NULL. Since the data feed control blocks are created in the order in which they appear in the configuration file, they need to be alphabetically sorted in order to generate a sorted array of pointers that is stored in field 1022 of global interest list control block 1000.

Before completing the initialization phase, a variety of housekeeping tasks are taken care of (step 4102). This includes such tasks as, recording the number of pages in the memory heap, and setting initialization flag 1002 in global interest list control block 1000. After completing these tasks, the configuration file is no longer needed so it is closed.

After the database has been initialized, the remaining components of the RTE process are initialized. In particular, a named shared memory area (i.e., global statistics data structure 1016 in FIG. 3) is allocated for keeping global statistics for the RTE process (step 4104). Then, the RTE process allocates memory for ring of buffers 3800 (FIG. 17), locks buffer access semaphore 3820 for the first message buffer area 3830 and allocates memory for message buffers 3700 (steps 4106).

Next, the other threads are created, starting with the updater thread, the thread for the private pipe and finally the threads for the feed servers (section 4108). After the updater thread is created, that thread sits on the locked buffer access semaphore 3820 of the first buffer area until the lock is released and it is permitted to process the messages held there.

After the updater thread is created, its priority is immediately increased from a middle level priority to a time critical priority. A similar step is taken for all threads that read incoming messages from feed servers, namely, threads 3 through 9.

Before finishing this phase of initialization, the RTE process sets up an exit list routine which is called automatically upon termination of the RTE process. The exit list routine handles clean up and deallocation of memory.

The main thread also establishes a signal handler routine which defines the CTRL-Break key combination as an instruction to exit from the process.

After initialization, the primary function of the main thread of the RTE process is to wait for the engine running flag 1004 to be cleared, signaling for termination of the RTE process (see FIG. 22). Periodically, during this phase, the main thread wakes up and checks for an expired time out of the current updater buffer (i.e., the buffer number identified in field 3804 of ring of buffers 3800). If the timeout for the current updater buffer has expired, the next buffer is locked and the current buffer is released to the updater thread which sends the messages held in it to the master interest list. While checking ring of buffers 3800, the RTE process locks a buffer ring semaphore (not shown) to control access to the entire ring.

As soon as the main thread detects that the RTE process system semaphore has been cleared, the RTE process proceeds with the termination of the RTE process, as shown in FIG. 23.

Thread 2: Read RTE Private Pipe

Referring to FIG. 24, thread 2 is responsible for accepting connections and reading messages from the pipe that is used by the RTE for internal delete messages. Once a connection to the private pipe is established, the RTE process enters a read message loop. The purpose of the read message loop is to move messages from the associated message buffer 3700 to ring of buffers 3800 in preparation for their being sent to the master interest list by the updater thread.

At the beginning of the read message loop, the RTE process first checks whether there is indeed a message in the loop (section 4110) and then whether the number of bytes of the message equals what was expected (section 4112). Failure of the first test terminates the read message loop; failure of the second test dumps that message and moves onto the next message.

If a message requiring transfer to ring of buffers 3800 is found, then the RTE process locks the buffer ring semaphore so no other threads may have access and proceeds to transfer the message into ring of buffers 3800 (section 4114). If the message does not fit into the current buffer identified by the reader buffer number index in field 3802, the buffer access semaphore 3820 of the next buffer structure 3810 (see FIG. 18) is locked and the current buffer area is released to the updater thread. The message is then read into the next buffer area and its buffer access start time is set.

Before leaving ring of buffers 3800, the RTE process checks the buffer access start time for the buffer structure on which the updater thread is sitting (section 4116). If its time has expired, it is released to the updater thread and the buffer access semaphore of the next buffer structure is set.

Threads 3-9: Feed Server Pipes

Threads 3-9 are responsible for accepting connections and reading messages from the pipes that are used between feed servers and the RTE. As indicated by the pseudo-code of FIG. 25, these threads operate in the same way as thread 2.

Thread 10: Updater Thread

The updater thread is responsible for updating the RTE interest list database with messages received from feed servers. The updater thread performs the operations shown in FIGS. 26a-b.

The updater thread has an outer buffer processing loop (line 4120) during which it waits for the next available buffer structure 3810 (See FIG. 18). In this loop, the updater thread sits on buffer access semaphore 3820 of the current buffer 3810 and waits for it to be cleared. When that semaphore is cleared, the underlying buffer area is released to the updater thread so that its messages may be transferred to the master interest list. When buffer access semaphore 3820 is cleared, the updater thread moves into a message processing loop (line 4122) during which it processes each message held in the underlying message buffer area 3830.

In the message processing loop, the updater thread reads the header of the message to identify the data feed and then locates the data feed interest list by performing a sequential search through the data feed control blocks 110 in data dictionary 1018 of global interest list control block 1000 (see FIG. 3). If the identified data feed control block is not found, the updater thread continues onto the next message (step 4138). If the identified data feed control block is found, the updater thread checks if the message length meets minimum requirements for a valid message (section 4124).

The updater thread discards messages having invalid lengths and then moves onto the next message. However, if this message passes the valid length check, the updater thread looks at its header to identify the message type. The message may be either a refresh message, which is typically sent by a smart feed server in response to one time request from the application for refresh, an update message, which supplies updated data for keys identified in the interest list and/or filter list of the application, or an internal delete message, which is used by the RTE to delete fields and/or keys from its application interest lists.

If the message is a refresh message, the updater thread executes a sequence of code found in section 4126. During this phase, the updater thread checks the application request pending flag among the applications flags 1214 of application information structure 1202 (see FIG. 9) to determine if there is actually a request pending. If a request is pending, the updater thread partially reformats the message using information in translation tables 1090 available through the associated data feed control block 110 (see FIG. 4), sets the application request access semaphore, places the partially formatted message on an application refresh pending queue and then clears both the application request access semaphore and the application request pending flag.

In the case of refresh messages or if it is not a refresh message but rather an update message, the updater thread executes code starting at line 4128. The purpose of the code in this section is to move the data in the message into the appropriate records within the master interest list. After performing a validity check on the length of the message key, the updater thread attempts to locate the appropriate master interest list record 2000 (see FIG. 5) by conducting a search through the hash index in data feed control block 110 (see FIG. 4). If the record is found, the updater thread locks its access semaphore 2004 and enters a field process loop to process each field of the message (line 4130).

During the field process loop, the updater thread searches down the linked list of field blocks 2016 (see FIG. 6) to find the field data structure 2020 for that field. If the field data structure is found, the updater updates data element 2032 in that structure. At this time, the updater thread also updates several counts which will be checked later by the polling function to determine if an update has occurred which needs to be provided to the application. The updater thread increments update count 2022 in field data structure 2020 (see FIG. 7); it increments update count 2006 in master interest list record 2000 (see FIG. 5); and it increments the total field update counter 1030(1) in the data feed statistics field 1030 of data feed control block 110 (see FIG. 4).

After updating the field data structure, the updater thread checks field flags 2026 (see FIG. 7) to determine whether that field is being "watched" by any filter list application (i.e., a queuing application) (line 4132). If it is, the updater thread formats the update and places formatted message on the filter list queues for the identified filter list applications. Then, the updater thread releases the appropriate queue semaphores so that the message may be sent to the applications (line 4134). In particular, the updater thread clears reader wait semaphore 3522 in queue information structure 3500 (see FIG. 15).

The updater follows this same set of steps for each field of the message. If a field occurs which cannot be found among the field blocks, the updater thread attempts to find that field in the data dictionary of data feed control block 110. If the field is found, the updater thread moves to the next message field and process it as described above. If the field is not found in the data dictionary, the field process loop is terminated.

If the message is an internal delete message, the updater thread executes the code beginning at line 4136. The function of this code is to eliminate for each key in the message those master interest list records that are not being used by any other application, as indicated by the array of process ID's in field 2010 of master interest list record 2000.

RTE Application Programming Interface Algorithms

API 15 (see FIG. 1) includes a set of algorithms which enables any application to request and retrieve realtime information in as time-efficient a manner as possible. These functions include (1) registration and termination functions which enable the application to establish a connection with the RTE; (2) catalog functions which enable the application to learn what data feeds are available and what data they can provide; (3) interest list functions for adding to and deleting from the interest list records which identify the data feeds, the keys and the fields for which the application wants the most current information when it polls the RTE; (4) filter list functions for adding to and deleting from the filter list records which identify the data feeds, the keys and the fields for which the application wants all information supplied by the data feed; and (5) data retrieval functions including a polling function for obtaining the most recent updates of keys and fields identified in the applications interest list, and a filter list reading function for obtaining all updates that have arrived from the feed servers for that application. Each of these categories of functions will now be described.

Registration and Termination Functions

The registration and termination functions are used by the application to register with the RTE and terminate use of the RTE and are always the first and the last functions that an application calls. The application uses the registration function to initiate contact with the RTE and it uses the termination function whenever it is finished using the RTE.

Referring to FIG. 27, the registration function registers the application with the RTE and allows the application to use the RTE. When called, the registration function specifies the application type and function. Recall that there are three valid application types, namely, a polling application, a queuing application and a polling/queuing application. A polling application uses the RTE as a data cache manager. The application specifies items of interest to the RTE. The application repeatedly polls the RTE at intervals selected by the application for changes to the application interest list. During a poll the RTE will call the application for every changed item whose current value is different from that of the application. A queueing application uses the RTE as a filter list manager. The RTE will queue feed server messages the application has an interest in. The application is responsible for reading and processing the queued messages. Finally, a polling/queuing application is a application which uses both methods described above to retrieve realtime data.

In the case of a polling application, the registration function also specifies an application function pointer which the RTE uses to communicate data to the application.

When the registration function is called, the RTE stores a pointer to a call back function in field 1234 of application information structure 1202, which the RTE uses to write updates back to the application. It maps the RTE private shared memory identified by the pointer in field 1242 into the application process' address space. It also attempts to find the application's process ID by searching through global application information structure 1020 (see FIG. 8). If the process ID is not found in the table, indicating that a structure has not yet been assigned to that application, and if the space is available (i.e., at least one of the twelve possible structures is unassigned), the RTE allocates the memory required for the interest/filter lists and assigns and initializes an available application information structure.

Referring to FIG. 28, the termination function deletes the application interest and/or filter list[s] and frees the memory associated with those lists. Keys not in use by other applications are deleted from the master interest list and delete messages are forwarded to smart feed servers. Deleting interest lists (and filter lists, for that matter) requires three steps, namely, opening the list, deleting the list (i.e., marking it for deletion), and closing the list. The process of closing the list implements the deletion.

Note that in the case of an application which is both a polling and a queuing application, the RTE uses a don't write request bit to prevent the sending of request messages upon the closing of the interest list. This bit is then cleared during the filter list deletion phase and the messages are then sent. This is an efficiency feature which prevents messages from being sent to the feed servers at two different times during the termination phase.

Once the application calls the termination function, it can no longer use the RTE until it again calls the registration function. If the application does not call the termination function, the RTE calls the termination function for the application when application process terminates.

The termination function also clears any set semaphores which should be cleared, such as, list access semaphore 1238 in application information structure 1202. (List access semaphore 1238 could have been left in a set state if the application crashed when the interest list was open.)

Catalog Functions

The catalog functions are used to retrieve data feed and field information from the data dictionary data structures 1018 (see FIG. 3). Most of the catalog functions use two areas in the application information structure 1202 to return retrieved information about the data feed. The information about the data feed and the fields being browsed is returned to the application via structures supplied by the application. The location of the application in the data feed table (i.e., sorted array of pointers in field 1022 of FIG. 3) is stored in field 1222. The location of the application in the field table (i.e., sorted array of field names 1070 of FIG. 4) is stored in field 1224.

Three of the catalog functions (i.e., rte_getfstdf, rte_getnxtdf, and rte_getdf shown in FIGS. 29, 30 and 31, respectively) enable the application to browse through the sorted array 1022 of pointers to the data feed control blocks stored in global interest list control block 1000 (see FIG. 3) and retrieve information about the data feeds. The rte_getfstdf function positions the application on the first data feed in the alphabetically arranged list. The rte_getnxtdf function moves the application to the next lower data feed in that list. And the rte_getdf retrieves the information about the data feed on which the application is positioned.

Three other functions (i.e., rte_getfstfld, rte_getnxtfld, and rte_getfld shown in FIGS. 32, 33, and 34, respectively) enable the application to browse through an alphabetically sorted array of pointers to the fields (see field 1046 of data feed control block in FIG. 4) and retrieve information about the fields. The rte_getfstfld function positions the application on the first field in the alphabetically arranged list. The rte_getnxtfld function moves the application to the next lower field in that list. And the rte_getfld retrieves the information about the field on which the application is positioned.

Interest List Maintenance Functions

The interest list maintenance functions are available for managing the interest lists for polling applications. Recall that the interest lists identify for the different data feeds, the keys and the fields for which the application desires updates when it polls the RTE. The interest list maintenance functions fall into three categories, namely, opening interest lists, modifying the interest lists, and closing the interest lists. No changes can be made to an interest list until that list is opened. Then, no changes are actually implemented to that list until it is closed. Upon closing the interest list, the changes are implemented and messages for the feed server pipes and the internal delete pipe are queued in preparation for sending.

The opening function is carried out by the rte_openilist function shown in FIG. 35. When called, the rte_openilist function checks the interest-list-open flag (among the application flags 1216 in the relevant application information structure 1202, see FIG. 9) to determine whether it is already open (line 4202). If the interest list is not open, the RTE checks list access semaphore 1238 of application information structure 1202 to make sure that it is clear and the interest/filter list information structures 3000 (see FIG. 10) may be accessed. If list access semaphore 1238 is cleared, the RTE sets that semaphore, it sets poll access semaphore 1240 in application information structure 1202 to prevent any polling of the interest list while it is open, and it maps the RTE private shared memory to the application process. After these steps are completed, the RTE sets the application interest-list-open flag to indicate that the interest list is now open.

Once the interest list for the application has been opened, the application may use another set of function calls to modify the list. Among the available functions for modifying an open interest list is: an rte_addilist function (FIGS. 36a, 36b and 36c) for adding an item (key or field); an ret_delikey function (FIG. 37) for deleting a key; an rte_delifield function (FIG. 38) for deleting a field; and an rte_delilist function (FIG. 39) for deleting a list. Each of these functions will now be described. Note before proceeding, however, that during execution of these function calls, the RTE maintains statistics in the data feed control blocks for the respective feed servers, indicating whether the changes that occurred while the interest list was open will require that any messages be sent to the feed servers. As will become apparent during the subsequent description of the close interest list function call, these statistics are later used when the interest list is closed to determine which pipes must be opened to send those messages.

Referring to FIGS. 36a–c, the rte_addilist function requires arguments identifying a data feed, a key, a key instance, and a field. When the rte_addilist function is called, the RTE identifies the data feed and verifies that it is among the data feeds listed in the data dictionary. Then, it does a similar check for the field specified by the function arguments. If both the data feed and the field are valid, it boosts the priority of the application process and sets its list access semaphore 1238 in application information structure 1202 (section 4210). Then, the RTE searches through the interest/filter list information structures 3000 (in field 1228 of application information structure 1202, see FIG. 9) for the application to find one for the data feed of interest. If one is not found, it is created.

Once the data feed interest list is found (or created), the RTE searches through the hash index of the data feed control block to find a master interest list record for the key. If the master interest list record is found, the delete message flag in the record is cleared and the delete sent flag (see record flags 2014 in FIG. 5) is checked to determine whether a delete message has been sent. If the delete sent flag is set, the send add message flag is set, indicating that the item (key) should again be added. (Section 4212)

If the master interest list record is not found, it is created and added to the hash index (section 4214). For the new master interest list record, the RTE sets the send add message flag in the record, and it increments the add message counter contained in the data feed control block.

If the application process ID is not listed among the array of process ID's in the master interest list record, it is added (section 4216).

Next, the specified field is added to the master interest list record (section 4218). At the beginning of this phase, the RTE sets access semaphore 2004 in the record (see FIG. 5) to block other applications from having access. To add the specified field, the RTE attempts to locate an available field data structure 2020 (see FIG. 6) which may be used. If none are available, the RTE creates a new field block and uses the first one of its field data structures. Once a field data structure is available, the RTE initializes its field components to get it ready to accept data. This involves, among other things, setting the field flags to indicate that it does not yet contain data, and specifying the field length and type in the appropriate fields of field data structure 2020 (see FIG. 7).

If the add message bit in the master interest list record is not set, indicating that a new record had not been added, then the RTE sets the send refresh message bit to request an immediate update of the values for that key.

The next phase of the function's operation adds the key to the application's interest list record (section 4220). First, a search is conducted for an interest list record 3100 (see FIG. 11) associated with the identified instance of the key. If none is found, a new interest record for that instance of the key is added to the application's interest list, either to the duplicate chain, if other instances of that key exist, or to the hash chain if no other duplicates exist. At the end of this section, a pointer back to the master interest list record is stored in field 3114 of the interest list record for that instance of the key, thereby linking the application's interest list record into the master interest list.

Finally, the interest list field structure is added (section 4222). First, a search is conducted of the linked list of interest list field structures 3200 (see FIG. 12) to determine whether one is already present. If it is not found, memory is allocated for a new field structure and it is added at the beginning of the linked list.

At the conclusion of the rte_addilist function call, change flag 3002 of interest/filter list information structure 3000 is set to TRUE (line 4224). This will force a check of all interest list records during the function call for closing the interest list. Also, the change bit among flags 3104 of the interest list record 3100 (see FIG. 11) is set to TRUE (line 4226), identifying that record as having been changed. As a precaution, the interest list record delete bit among those flags is cleared.

Referring to FIG. 37, the rte_delikey function deletes an identified instance of a key from the application's interest list. The RTE locates the relevant interest list record and sets its delete record bit (which is one of flags 3104 in interest list record 3100 shown in FIG. 11) to TRUE, thereby marking it for actual deletion during the close interest list operation. Then, the RTE deletes all of the interest list field structures 3200 for that record, freeing up the memory used by those structures. If the instance number specified as an argument of the function call is zero, the RTE performs the same operations for all duplicates (i.e., all other instances of that key).

Referring to FIG. 38, the rte_delifield function deletes an identified field from a key in the application interest list. First, the RTE confirms that the data feed and the identified field exist. Once confirmed, the RTE locates the interest/filter list information structure 3000 (see FIG. 10) for that data feed, then it locates the interest list record 3100 (see FIG. 11) for the identified key, and finally it locates the interest list field structure 3200 (see FIG. 12) and deletes it. If the instance number supplied with the function call is zero, the RTE deletes that field from all instances of the key.

Referring to FIG. 39, the rte_delilist function deletes all keys and fields in the application's interest list. The RTE accomplishes this by setting the delete flag in all of the interest list records 3100 (see FIG. 11) associated with that application to TRUE, thereby marking them for deletion. It also deletes all of the interest list field structures 3200 (see FIG. 12) associated with the marked application interest list records. After calling this function and then closing the interest list, the application will no longer be able to retrieve updates from the RTE until items are once again added.

Referring to FIGS. 40a, 40b, 40c and 40d the rte_closeilist function implements all of the changes that were made to the interest list while it was open. In general, when this function is called, the RTE searches through the application interest list to identify all interest list records marked for change, it takes the steps required to implement the change within the interest list, and it queues whatever messages to the feed server may be required to complete the change. If the changes to the interest list are deletions which result in master interest list records that are not referred to by any other application, those master interest list records are also marked for deletion and then deleted.

During the first phase of the rte_closeilist function call, the RTE does the deletions that were called for while the interest list was open (section 4300). In carrying out this operation, the RTE proceeds through each interest/filter list information structure 3000 (see FIG. 10) found in field 1228 of application information structure 1202 (see FIG. 9), through each hash bucket 3020 identified in the hash index of each interest/filter list information structure 3000, and through each interest list record 3100 in the hash chain of interest list records for keys that yield duplicate hash values (see FIG. 11).

For each key, the RTE determines whether all instances of that key are marked for deletion, and, if they are, it examines the array of process ID's in field 2010 of the master interest list record 2000 to which those instances point (see FIGS. 5 and 11) to determine whether the master interest list record is being used by any other application. If the master interest list record is not being used by any other application, the RTE marks it for deletion by setting the appropriate one of record flags 2014. Then, the RTE deletes all interest list record instances for that key. As a precaution, the RTE also deletes all fields for those interest list record instances even though this should have been taken care of earlier.

In the event that only some of the interest list record instances are deleted, the RTE readjusts the linked lists connecting the instances and the records for duplicate hash values, if appropriate.

After the deletions are taken care of, the RTE opens all feed server pipes that will be required (section 4302). To determine whether any pipes must be opened, the RTE examines a no pipe write flag in the application information structure 1202 (see FIG. 9). The no pipe write flag is used to record whether any of the modifications which were made to the application interest list while it was open would necessitate communication with a feed server. If the no pipe write flag is FALSE, the RTE then determines which pipes need to be opened by examining the counts for the adds, refreshes, deletes and internal deletes that are kept among the data feed statistics stored in each data feed control block 110 (see FIG. 4). If any pipes to feed servers need to be opened, the RTE checks whether the counts for any deletes or internal deletes are greater than zero. If the counts for either deletes or internal deletes are greater than zero, the close function sets an internal write delete request flag that will be used later to open the private pipe. The close function then opens whatever feed server pipes are required. At the end of this phase of operation, the RTE checks the internal write delete flag, and if it is TRUE, opens the private pipe. Also, during this phase of operation, the RTE allocates memory for remembering all of the master interest list records that are being deleted. If an error occurs during sending the messages which implement the deletions and the records are not deleted, the information which is stored in this memory is used to resend the deletion messages.

Once the appropriate pipes have been opened, the RTE begins to do the work of implementing the changes called for while the application interest list was open (section 4304). The RTE again checks the statistics in each data feed control block to determine whether an add, a refresh or a delete message should be sent to the corresponding feed server. For any smart feed server to which such messages are to be sent, the RTE obtains the identity of the pipe that is to be used, it sets a feed server open flag, indicating that the feed server is in use, and it initializes a set of local variables and message buffers that are to be used for the messages.

When the initialization is complete, the RTE sends the messages, starting with the add messages (section 4306), then the refresh messages (section 4308) and finally, the delete messages (section 4310). Note that the messages are handled in order of a precedence rule. If an add message is sent, then neither a refresh message nor a delete message is sent. Similarly, if an add message is not sent but a refresh message is, then a delete message is not sent. A delete message is sent only if there is no add message or refresh message sent for that record.

With regard to the add messages, the RTE goes through each hash bucket 1050 identified through data feed control block 110 (see FIG. 4) and looks at each master interest list record 2000. If the send add message flag among record flags 2014 is set, the RTE prepares to place the appropriate add message in an add message buffer 1008 of global interest list control block 1000 (see FIG. 3) from which it will be sent to the feed server. First, the RTE checks if the add message buffer 1008 can accept any more messages. If the buffer cannot accept more messages, the RTE empties the add message buffer by sending the add message for the keys held there. If the message is sent successfully, the RTE clears the send add message, the send refresh message, and the send delete message flags in the master interest list records for all keys that were successfully sent. Once the add message buffer is freed up, the RTE copies the key from the master interest list record which was marked for an add message into the add message buffer.

The sequence of steps in sections 4308 (for refresh messages) and section 4310 (for delete messages) are very similar to those just described, except for the following differences. For the refresh messages, there is a refresh message buffer 1010 in global interest list control block 1000 (see FIG. 3). When a refresh message from this buffer is successfully sent, the RTE clears the send refresh message and the send delete message flags (but not the add message flag) in the master interest list records for all keys that were successfully sent. For the delete messages, there is a delete message buffer 1012 (see FIG. 3). If this buffer is full, the RTE sends a delete message to the feed server and to itself. When a delete message from this buffer is successfully sent to the feed server, the RTE clears the send delete message flag (but not the add message and the refresh message flags) and sets the delete message sent flag in the master interest list records for all keys that were successfully sent.

After all of the add, refresh and delete messages are processed, the RTE sends messages to itself to eliminate the master interest list records that are marked for internal deletion (section 4312). These records can arise if a record is added and deleted during the same open/close session. As for the previously described messages, there is a message buffer 1014 for the internal delete messages (see FIG. 3). The internal delete message is added to this buffer. If the buffer is full, it may have to be emptied beforehand. The process of successfully sending the internal delete messages that are required to free up the buffer also results in setting the delete message sent flags in the affected master interest list records.

At this point one or all of the message buffers may still contain keys that require sending. Therefore, the RTE empties the add message buffer (section 4314), the refresh message buffer (section 4316), the delete message buffer (section 4318) and finally, the internal delete message buffer (section 4320). During each of these phases, the appropriate flags are cleared and/or set as previously described.

Once all of the message buffers have been emptied, the RTE repeats the same sequence of events for all other feed servers to which messages must be sent. After the RTE has dealt with all of the feed server pipes, it closes all open feed server pipes, it closes the RTE pipe, and it clears the list access semaphore, the interest list open semaphore, and the poll access semaphore.

Filter List Maintenance Functions

The filter list maintenance functions are available for managing the filter lists for queuing applications. Recall that the filter lists identify for the different data feeds, the keys and the fields for which the application desires all updates that were received from the data feed. The filter list maintenance functions fall into three categories, namely, opening filter lists, modifying the filter lists, and closing the filter lists. No changes can be made to a filter list until that list is opened. Then, no changes are actually implemented to that list until it is closed. Upon closing the interest list, the changes are implemented and messages for the feed server pipes and the internal delete pipe are queued in preparation for sending.

The opening function is carried out by the rte_openflist function shown in FIG. 41. Once the filter list for the application has been opened, the application may use another set of function calls to modify the list. Among the available functions for modifying an open filter list is: an rte_addflist function (FIGS. 42*a–b*) for adding an item (key or field); an ret_delfkey function (FIG. 43) for deleting a key; an rte_delffield function (FIG. 44) for deleting a field; and an rte_delflist function (FIG. 45) for deleting a list. Finally, an rte_closeilist function (FIGS. 46*a*, 46*b*, 46*c* and 46*d*) implements all of the changes that were made to the filter list while it was open.

The operation of these functions is similar to the corresponding functions for the interest list, except that they perform their operations on application filter lists rather than application interest lists. Another significant difference is that filter lists do not have multiple instances of a key as do the interest lists. Therefore, the filter list maintenance functions typically have fewer looping levels since they need not loop through duplicate chains of filter list records. In most other aspects, as can readily be seen from the pseudo-code descriptions, the filter list maintenance functions perform basically the same sequence of operations as do the equivalent interest list maintenance functions. Thus, in light of the explanation provided about the interest list functions, the filter list functions are self explanatory and do not require further discussion here.

Data Retrieval Functions

The data retrieval functions are used to retrieve data for both polling and queueing applications. There are two such functions, namely, an rte_update function (FIGS. 47*a–b*) used by polling applications to retrieve the most recent changes that have been made to the application interest list since the last poll, and an rte_read function (FIG. 48) for reading all of the messages of interest which have arrived from the feed servers, and are stored in the queue information structure 3500 (see FIG. 15).

Referring to FIGS. 47*a–b*, a polling application uses the rte_update function (referred to hereinafter as the update function) to obtain all the updates to an interest list since the last time this routine was called. When the application calls the update function, that function conducts four levels of checking of the application interest list before it returns an update to the application. The four levels of checking are to determine: (1) have there been any updates received from the feed server; (2) if updates have been received, were any of the records of interest changed; (3) for each record that has changed, have any of its fields changed; and finally, (4) for each field that has changed, has its value changed? For all updates that pass the four levels of checking, the update function calls the application "callback" routine to send the updates to application.

When the update function is called, it first takes care of a variety of preliminary matters, such as, setting the poll access semaphore 1240 in application information structure 1202 (see FIG. 9) to block all other polls of the application interest list from occurring while this poll is taking place. Then, for each interest/filter list information structure 3000 within application information structure 1202, the update function performs the first level of checking to determine whether there have been any updates received from the feed server (line 4402).

During this phase, the update function determines whether the interest/filter list information structure 3000 was changed by checking change flag 3002 in that structure (see FIG. 10). It also determines whether the master interest list was updated since the last poll by comparing the field update count 3004 in interest/filter list information structure 3000 with the total number of field updates reported in field 1030(2) of the data feed statistics block of data feed control block 110 (see FIG. 4). Note that the update count reported in structure 3000 corresponds to the number of updates that were made to the master interest list as of the last update poll; whereas, the update count in the data feed control block corresponds to the total number of updates to the master interest list for this feed server at the time of the current poll. A difference in these two counts (e.g., the former count being less than the latter count) indicates that changes have been made to the master interest list that have not been reported to the application.

If the first level of checking indicates that updates have been received since the last poll, the update function sets the update count in interest/filter list information structure 3000 for that data feed equal to the update count for that data feed as found in field 1030(2) of the data feed control block 110 (see FIG. 4). Then, the update function loops through each interest list hash bucket identified in structure 3000, and for each hash bucket through each interest list record 3100 in the hash chain, and for each duplicate hash value record through each interest list record in the duplicate chain (i.e, each record for the different instances of the relevant key). For each interest list record in the hash chain, the update function sets an internal new updates flag to FALSE. (Note that the internal new updates flag is not the new updates flag within the field data structure, but rather is an internal flag used to achieve greater efficiency.) Also, recall that there is a hash chain of interest list records identified by the pointers stored in field 3108 of the interest list record 3100 and that there is a duplicate chain of different instances of the same key identified by the pointer in field 3110 of that record. In other words, the update function traces down these linked lists to identify all of the relevant interest list records. For each identified interest list record 3100, the update function uses pointer in field 3114 to locate its associated master interest list record 2000 (see FIG. 11).

In each master interest list record thus located, the update function sets access semaphore 2004 (see FIG. 5) and then performs the second level of checking (line 4404). During this phase, the update function checks the change flag located among flags 3104 in interest list record 3100. The update function also compares the record update count 3103 in application interest list record 3100 (see FIG. 11) with update count 2006 in master interest list record 2000 (see FIG. 5). If this second level of checking indicates that records have been updated since the last poll, the update function sets record update count 3103 in application interest list record 3100 equal to update count 2006 in master interest list record 2000 and moves onto the third level of checking by examining each application interest list field structure that is in the singly-linked list identified by the pointer in field 3116 of interest list record structure 3100 (see FIG. 12).

During the third level of checking and for each field data structure 2020 identified by the pointer in field 3208 of interest list field structures 3200, the update function determines whether that field data structure is new or has been changed since the last poll (line 4406). To make this determination, the update function first checks the new interest list field flag among field flags in the application interest list field data structure (see FIG. 12). Note that the application interest list record field data structure is also referred to as the previous field data structure and is stored in field 3206 of interest list field structure 3200 (see FIG. 12). Then, the update function compares field update count in the application interest list record field data structure with field update count 2022 in the master interest list record field data structure 2020 (see FIGS. 7 and 12).

If the update function determines that there has been a change to the field, and if the change was due to its being a new field, the update function clears the new interest list field flag in application interest list field data structure and remembers its original value by setting an internal new interest list field flag to TRUE. Then, regardless of the reason why the field has changed, the update function sets the update count in the application interest list field data structure equal update count in the master interest list record field data structure.

After revising the update count, the update function then performs the fourth level of checking in which it determines whether the application interest list field value is different from what it was during the last poll (line 4408). To determine if a change has been made to the actual data value of this field, the update function checks the internal new interest list field flag for the application interest list field and also compares the data element value in the previous field data structure (in field 3206 of interest list field structure 3200, see FIG. 12) with the element data value in field 2032 of the master interest list record field data structure 2020 (see FIG. 7).

If the field data value has changed since the last poll, the update function copies the master interest list record field data value into the application interest list field data value and sets the field updated bit among the field flags in the previous field data structure 3206 to TRUE. Then, the update function sets the internal new updates flag for the application interest list fields. These steps mark the interest list field structure so that its field value will be transferred to the application during the last phase of operation of the update function.

After all checks have been performed on each application interest list field and the appropriate application interest list field data structures have received the updated values, the update function clears the master interest list access semaphore and then checks the internal new updates flag for the application interest list field structures (line 4410). If the flag is TRUE, the update function goes through each application interest list field structure in the linked list of structures (see pointer in field 3116 of interest list record 3100 in FIG. 11) and checks the field updated bit to see if the interest list field has been updated.

For each field that has been updated, the update function formats the data stored in the previous field data structure and places the formatted data into an update buffer. Then, the update function uses the previously supplied call back routine (supplied when the application registered with the RTE) to send the formatted data value to the application. The formatting involves, among other things, appending the application supplied private data that is identified in the interest list field structure 3200 (in field 3202 of FIG. 12) and the interest list record 3100 (in field 3112 of FIG. 11).

Following the above-described sequence of steps, the update function passes through the entire application interest list until it has transferred to the application the data values for all application interest list fields which pass the four tests previously described.

Referring to FIG. 48, a queuing application uses the rte_read function (referred to hereinafter as the read function) to obtain a single data item stored in queue information structure 3500 (see FIG. 15). Recall that queue information structure 3500 holds all updates that are received from the feed server and that are identified in the application's filter list as being of interest to the application. When the application calls the read function, that function sends the first message in the queue to the application. The application uses repeated calls to the read function to empty the queue of all messages held there.

Initially, the read function sets queue access control semaphore 3520 in queue information structure 3500. Then, it checks if there are any messages waiting in the queue. If no messages are there, the read function sets reader wait semaphore 3522, and clears access control semaphore 3520 and then sits on reader wait semaphore 3522 until it is cleared by one of two mechanisms. When the updater thread passes messages to the queue it clears reader wait semaphore 3520. However, if no messages appear in the queue within a predetermined amount of time, there is a timeout mechanism which also clears wait semaphore 3520. The predetermined time represents the amount of time that the read function is permitted to wait for update messages before it returns control to the application.

If a message arrives in the queue before the timeout expires, the read function again sets access control semaphore 3520 and then obtains the pointer to the first queue data structure 3600 from field 3516 of the queue information structure 3500. The read function adjusts the pointer to point to the next member of the queue and then clears the access control semaphore.

The field data value in the queue data structure that was obtained from the queue is formatted into a message that is then placed on another queue for transfer to the application. The memory occupied by that queue data structure is then freed up.

Other embodiments are within the following claims.

What is claimed is:

1. A realtime engine for interfacing one or more data feeds with an application, each one of said one or more data feeds having an associated group of items for each member of which that data feed delivers realtime data, the interface comprising:

means for caching data values most recently received from a selected one of said one or more data feeds for at least some members of the associated group of items for the selected data feed, wherein said caching means caches a data value that is most recently received for any given item by replacing a previously received data value for said given item with the most recently received data value for said given item;

means for retrieving at least some of said cached data values in response to a request for updates from the application; and means for sending the retrieved data values to the application in response to the request for updates, wherein said caching means updates its cached data values with realtime data received from said selected data feed when said realtime data is received from said selected data feed and wherein said caching means performs said updating automatically and on an ongoing basis irrespective of whether the application has requested any updates, and wherein said retrieving means comprises means for determining which of said cached data values for a given set of items are different in value from data values for that set of items last sent to the application by said sending means, and wherein said retrieving means retrieves and said sending means sends only those cached data values having values that are determined to be different from the last sent data values for that set of items.

2. The engine of claim 1 further comprising means for identifying a subset of the associated group of items for the selected data feed, said subset containing items for which the application desires data, and wherein said subset identifies the members of the associated group for which said caching means caches the most recently received data values.

3. The engine of claim 2 further comprising means for storing copies of the data values for said given set of items last sent to the application, and wherein the determining means compares contents of the storing means with contents of the caching means to determine which data values for said given set of items are different from those last sent to the application.

4. The engine of claim 2 wherein said caching means comprises means for recording for each cached item whether it has been updated by the data feed since data values for those cached items were last sent to the application, and wherein the sending means sends only those cached data values which are identified by said recording means as having been updated.

5. The engine of claim 2 further comprising means for enabling the application to add members to said subset.

6. The engine of claim 2 further comprising means for enabling the application to delete members from said subset.

7. A realtime engine for interfacing multiple data feeds with a plurality of applications, each one of said data feeds having an associated group of items for each member of which that data feed delivers realtime data to the realtime engine, the interface comprising:

a data structure means for identifying a set of items from among said associated groups of items for which updates are desired by one or more of the applications;

means for caching data values most recently received from said data feeds for the identified set of items;

means for retrieving certain of said cached data values in response to a request for updates from any one of the applications, wherein said caching means updates its cached data values automatically and on an ongoing basis irrespective of whether any of the applications has requested any updates;

means for sending the retrieved data values to the application in response to the request for updates; and an application data structure means for storing for each of said applications the data values last sent to that application by said sending means and wherein said retrieving means checks a particular data value stored by said application data structure against a corresponding data value stored by said caching means to determine whether to retrieve that particular data value for transmission to an application requesting an update.

8. The realtime engine of claim 7 wherein said set of items identified by said data structure means is a union of all items for which updates are desired by said applications.

9. The realtime engine of claim 7 wherein each item of said associated groups of items comprises a corresponding set of fields, each field of which represents different information about the item of which said corresponding set of fields are a part, and wherein said data structure means also identifies fields of the identified set of items, the identified fields being those fields for which updates are desired by one or more of the applications.

10. The realtime engine of claim 9 wherein said caching means caches data values most recently received from said data feeds for the identified fields.

11. A realtime engine for interfacing multiple data feeds with a plurality of applications, each one of said data feeds having an associated group of items for each member of which that data feed delivers realtime data to the realtime engine, the interface comprising:

a data structure means for identifying a set of items from among said associated groups of items for which updates are desired by one or more of the applications;

means for caching data values most recently received from said data feeds for the identified set of items;

means for retrieving certain if said cached data values in response to a request for updates from any one of the applications, wherein said caching means updates its cached data values automatically and on an ongoing basis irrespective of whether any of the applications has requested any updates;

means for sending the retrieved data values to the application in response to the request for updates; and an application data structure means for storing for a given one of said applications information relating to a last update of said given one of said applications and wherein said retrieving means in response to an update request from said given one of said applications checks the stored last update information of said application data structure means to determine whether to retrieve any cached values for said given one of said applications.

12. The realtime engine of claim 11 wherein said application data structure means comprises a first means for indicating whether any realtime data has been received from a given data feed for a particular item of the group of items associated with said given data feed since said sending means last sent an update for that particular item to said given one of said applications and wherein said retrieving means retrieves the data value for that particular item from said caching means for transmission to said given one of said applications only if said first means indicates that realtime data has been received for that particular item since said sending means last sent an update for that particular item to said given one of said applications.

13. The realtime engine of claim 12 wherein said application data structure means comprises a second means for indicating whether the particular item has been updated by one of the data feeds since said sending means last sent an update for that particular item to said given one of said applications and wherein said retrieving means retrieves the data value for that particular item from said caching means for transmission to said given one of said applications only if said second means indicates that said the particular item has been updated by one of the data feeds since said sending means last sent an update for that particular item to said given one of said applications.

14. The realtime engine of claim 13 wherein said application data structure means comprises storage means for storing for said given one of said applications the data values last sent to that application by said sending means and wherein said retrieving means checks a data value stored in said storage means for the particular item against a corresponding data value stored by said caching means to determine whether to retrieve that particular data value for transmission to said given one of said applications and wherein said retrieving means retrieves the data value for that particular item from said caching means for transmission to said given one of said applications only if the stored data value for that particular item in said storage means is different from the corresponding data value stored by said caching means.

* * * * *

UNITED STATES PATENT AND TRADEMARK OFFICE
CERTIFICATE OF CORRECTION

PATENT NO. : 5,404,488

DATED : April 4, 1995

INVENTOR(S) : Michael Kerrigan and Michael A. Dempsey

It is certified that error appears in the above-identified patent and that said Letters Patent is hereby corrected as shown below:

Col. 26, line 41, replace "queueing" with --queuing--.

Col. 26, line 46, replace "a" with --an--.

Col. 29, line 10, insert a period at the end of the sentence.

Col. 33, line 38, replace "queueing" with --queuing--.

UNITED STATES PATENT AND TRADEMARK OFFICE
CERTIFICATE OF CORRECTION

PATENT NO.   : 5,404,488

DATED        : April 4, 1995

INVENTOR(S)  : Michael Kerrigan and Michael A. Dempsey

It is certified that error appears in the above-identified patent and that said Letters Patent is hereby corrected as shown below:

Cover page, under [57] Abstract, line 2, replace "applications" with --application--.

Col. 5, line 3, replace "Note a" with --Note that--

Col. 17, line 32, replace "queueing" with --queuing--.

Col. 20, line 20, replace "a" with --an--.

Col. 21, line 22, replace "a" with --an--.

Col. 29, line 10, after "added" delete ".".

Signed and Sealed this

Ninth Day of July, 1996

BRUCE LEHMAN

*Attest:*

*Attesting Officer*   *Commissioner of Patents and Trademarks*